US009461946B2

(12) United States Patent
Zutphen

(10) Patent No.: US 9,461,946 B2
(45) Date of Patent: Oct. 4, 2016

(54) SYNCHRONIZED SINGLE-ACTION GRAPHICAL USER INTERFACES FOR ASSISTING AN INDIVIDUAL TO UNIFORMLY MANAGE COMPUTER-IMPLEMENTED ACTIVITIES UTILIZING DISTINCT SOFTWARE AND DISTINCT TYPES OF ELECTRONIC DATA, AND COMPUTER-IMPLEMENTED METHODS AND COMPUTER-BASED SYSTEMS UTILIZING SUCH SYNCHRONIZED SINGLE-ACTION GRAPHICAL USER INTERFACES

(71) Applicant: Stephen B. Zutphen, Dali (CY)

(72) Inventor: Stephen B. Zutphen, Dali (CY)

( * ) Notice: Subject to any disclaimer, the term of this patent is extended or adjusted under 35 U.S.C. 154(b) by 0 days.

(21) Appl. No.: 14/829,518

(22) Filed: Aug. 18, 2015

(65) Prior Publication Data

US 2016/0050168 A1 Feb. 18, 2016

Related U.S. Application Data

(60) Provisional application No. 62/038,521, filed on Aug. 18, 2014.

(51) Int. Cl.
*G06F 3/0486* (2013.01)
*H04L 12/58* (2006.01)
*G06F 3/0484* (2013.01)
(Continued)

(52) U.S. Cl.
CPC .............. *H04L 51/046* (2013.01); *G06F 3/017* (2013.01); *G06F 3/0481* (2013.01); *G06F 3/0482* (2013.01); *G06F 3/0486* (2013.01); *G06F 3/04842* (2013.01); *G06F 9/4443* (2013.01); *H04L 51/24* (2013.01)

(58) Field of Classification Search
None
See application file for complete search history.

(56) References Cited

U.S. PATENT DOCUMENTS 6,522,347 B1 * 2/2003 Tsuji ...................... G06Q 30/02
345/419
2006/0069604 A1 3/2006 Leukart et al.
(Continued)

FOREIGN PATENT DOCUMENTS

WO 2014/028735 A2 2/2014

OTHER PUBLICATIONS

White et al., U.S. Appl. No. 61/975,633, Appendix to Specification, p. 8.*
(Continued)

*Primary Examiner* — Matt Kim
*Assistant Examiner* — Daniel Samwel
(74) *Attorney, Agent, or Firm* — Greenberg Traurig, LLP

(57) ABSTRACT

An inventive exemplary graphical user interface which includes a visual display component specifically programmed with a plurality of actionable features allowing a user to perform at least the following: moving to and from the visual display component at least the following items: a first object corresponding to a first native application; a second object corresponding to a second native application, where the first native application is distinct from the second native application; a first data item of a first data type; and a second data item of a second data type, where the first data type is distinct from the second data type; where each of such items is moved by utilizing a single action while each item is in an active form or an inactive form; tracking such items based on timing of actions involving such items; and interacting as if each item being in a native computing environment.

16 Claims, 23 Drawing Sheets

(51) Int. Cl.
*G06F 3/0482* (2013.01)
*G06F 9/44* (2006.01)
*G06F 3/01* (2006.01)
*G06F 3/0481* (2013.01)

(56) References Cited

U.S. PATENT DOCUMENTS

| | | | |
|---|---|---|---|
| 2007/0288860 A1* | 12/2007 | Ording | G06F 3/04842 715/779 |
| 2008/0034318 A1* | 2/2008 | Louch | G06F 3/0486 715/781 |
| 2008/0282158 A1 | 11/2008 | Aaltonen et al. | |
| 2009/0228820 A1 | 9/2009 | Kim et al. | |
| 2010/0058216 A1* | 3/2010 | Yoon | G06F 3/0486 715/769 |
| 2010/0122194 A1* | 5/2010 | Rogers | G06F 3/0486 715/769 |
| 2011/0080356 A1* | 4/2011 | Kang | G06F 3/0486 345/173 |
| 2011/0199313 A1* | 8/2011 | Tsai | G06F 3/0486 345/173 |
| 2011/0307815 A1* | 12/2011 | Lampinen | G06F 3/04817 715/765 |
| 2012/0036556 A1* | 2/2012 | LeBeau | G06F 3/04817 726/3 |
| 2013/0047110 A1 | 2/2013 | Shimizu | |
| 2014/0157166 A1* | 6/2014 | Choi | G06F 3/04817 715/769 |
| 2014/0256295 A1* | 9/2014 | Peng | G06F 3/0486 455/412.2 |
| 2015/0106741 A1* | 4/2015 | Friend | H04L 51/16 715/752 |

OTHER PUBLICATIONS

International Search Report and Written Opinion from International Application No. PCT/IB2015/001965 dated Feb. 4, 2016.

* cited by examiner

SYNCHRONIZED SINGLE-ACTION GRAPHICAL USER INTERFACES FOR ASSISTING AN INDIVIDUAL TO UNIFORMLY MANAGE COMPUTER-IMPLEMENTED ACTIVITIES UTILIZING DISTINCT SOFTWARE AND DISTINCT TYPES OF ELECTRONIC DATA, AND COMPUTER-IMPLEMENTED METHODS AND COMPUTER-BASED SYSTEMS UTILIZING SUCH SYNCHRONIZED SINGLE-ACTION GRAPHICAL USER INTERFACES

RELATED APPLICATIONS

This application claims the priority of U.S. provisional application U.S. Patent Appln. No. 62/038,521; filed Aug. 18, 2014; entitled "SYNCHRONIZED SINGLE-ACTION GRAPHICAL USER INTERFACES FOR ASSISTING AN INDIVIDUAL TO UNIFORMLY MANAGE COMPUTER-IMPLEMENTED ACTIVITIES UTILIZING DISTINCT SOFTWARE AND DISTINCT TYPES OF ELECTRONIC DATA, AND COMPUTER-IMPLEMENTED METHODS AND COMPUTER-BASED SYSTEMS UTILIZING SUCH SYNCHRONIZED SINGLE-ACTION GRAPHICAL USER INTERFACES," which is incorporated herein by reference in its entirety for all purposes.

TECHNICAL FIELD

The present invention generally relates to synchronized single-action graphical user interfaces for assisting an individual to uniformly manage computer-implemented activities utilizing distinct software and distinct types of electronic data, and computer-implemented methods and computer-based systems utilizing such synchronized single-action graphical user interfaces.

BACKGROUND

A computer desktop can include a plurality of icons which are clickable to launch individual programs running independently of each other.

BRIEF SUMMARY

In some embodiments, the present invention is directed to an inventive exemplary graphical user interface which includes a visual display component which is: i) specifically programmed with a plurality of actionable features and ii) shown on a computing device of a user; where the plurality of actionable features allow the user, interacting with the visual display component, to perform, at a particular time period, at least the following: moving to and from the visual display component at least the following items: i) at least one first object corresponding to at least one first functionality of at least one first native application which is at least partially executable within the graphical user interface to perform at least one first native functionality; ii) at least one second object corresponding to at least one second functionality of at least one second native application which is at least partially executable within the graphical user interface to perform at least one second native functionality, where the at least one first native application is distinct from the at least one second native application; iii) at least one third object corresponding to at least one first data item of a first data type; and iv) at least one fourth object corresponding to at least one second data item of a second data type, where the first data type is distinct from the second data type; v) where each item of such items is moved by utilizing a single action by the user while each item is in an active form or in an inactive form; vi) where the visual display component is programmed such that when at least one item of such items is placed over the visual display, the visual display component allows the user to specify at least one of the following: 1) at least one first instant action involving the at least one item, 2) at least one first future action involving the at least one item, and 3) at least one first organizational action involving a first visual presentation of the at least one item on the visual display component; vii) where the visual display component is programmed such that when the at least one item of such items is placed over at least one other item of such items, the visual display component allows the user to specify at least one of the following: 1) at least one second instant action involving the at least one item and the at least one other item of such items, 2) at least one second future action involving the at least one item and the at least one other item of such items, and 3) at least one second organizational action involving a second visual presentation of the at least one item and the at least one other item of such items on the visual display component; tracking such items based on timing of actions involving such items, where the timing includes: i) a present time period corresponding to items being active at a particular time, ii) a past time period corresponding to items being active prior to the particular time and are inactive at the particular time, and iii) a future time period corresponding to items being in active at the particular time and will be active after the particular time passes; and interacting with each item of such items via the visual display component so that: i) each item behaves as if being in a native computing environment, and ii) a second execution of the native computing environment as an entire native program in parallel with the graphical user interface is avoided.

In some embodiments, the single action is a drag-and-drop action. In some embodiments, the single action is a swiping action. In some embodiments, the exemplary graphical user interface is configured to be executed as a stand-alone program on a desktop of the computing device. In some embodiments, the graphical user interface is configured to be remotely executed so that as computer instructions for the visual display component is transmitted to the computing device of the user over a computer network. In some embodiments, the at least one first functionality of the at least one first native application is the at least one first native application.

In some embodiments, the at least one second functionality of the at least one second native application is the at least one second native application. In some embodiments, the at least one first data item and the at least one second data item are selected from the group consisting of: i) a digital file, ii) an electronic message, and iii) an electronic Internet posting, and iv) a digital code.

In some embodiments, the first visual presentation and the second visual presentation specify a priority order in which such items are presented on the graphical user interface.

In some embodiments, the graphical user interface and the computing device of the user are specifically programmed to allow the user at least a plurality of the following: 1) by selecting at least one keyboard key, to create a recording and automatically associate the recording with the at least one item of such items with which the user is interacting; 2) to listen to the recording while browsing through such items and to start and stop the recording from within each item; 3)

selecting a single menu button, to receive a global notification of all messages for such items; 4) to receive a plurality of priority notifications having different colors for different levels of urgency; 5) to receive at least one notification related to each item of such item while the user interacts with each item; 6) to select different parts of a visual presentation of each item to perform distinct actions with each item; 7) to automatically create a relationship between such items when the at least one item of such items is placed over the at least one other item of such items; 8) to have a digital note being automatically placed in an area of the visual display component that is contextually related each item discussed in the digital note; 9) selecting a single menu button, to perform an action of obtaining data related to each item across a plurality of native applications; 10) to engaged in both threaded and non-threaded digital discussions; 11) to view a single area of the computing device which changes, at least partially, in color depending on a message type of an electronic message, an importance parameter associated with of the electronic message, or both; 12) to continuously view a message count; and 13) to participate in a conversation related to each item of such items with a plurality of participants.

In some embodiments, the present invention is directed to a computer-implemented method which includes at least the steps of: causing, by a specifically programmed computing processor, to display a graphical user interface on a computing device of a user; where the graphical user interface includes: a visual display component which is specifically programmed with a plurality of actionable features; where the plurality of actionable features allow the user, interacting with the visual display component, to perform, at a particular time period, at least the following: moving to and from the visual display component at least the following items: i) at least one first object corresponding to at least one first functionality of at least one first native application which is at least partially executable within the graphical user interface to perform at least one first native functionality; ii) at least one second object corresponding to at least one second functionality of at least one second native application which is at least partially executable within the graphical user interface to perform at least one second native functionality, where the at least one first native application is distinct from the at least one second native application; iii) at least one third object corresponding to at least one first data item of a first data type; and iv) at least one fourth object corresponding to at least one second data item of a second data type, where the first data type is distinct from the second data type; v) where each item of such items is moved by utilizing a single action by the user while each item is in an active form or in an inactive form; vi) where the visual display component is programmed such that when at least one item of such items is placed over the visual display, the visual display component allows the user to specify at least one of the following: 1) at least one first instant action involving the at least one item, 2) at least one first future action involving the at least one item, and 3) at least one first organizational action involving a first visual presentation of the at least one item on the visual display component; vii) where the visual display component is programmed such that when the at least one item of such items is placed over at least one other item of such items, the visual display component allows the user to specify at least one of the following: 1) at least one second instant action involving the at least one item and the at least one other item of such items, 2) at least one second future action involving the at least one item and the at least one other item of such items, and 3) at least one second organizational action involving a second visual presentation of the at least one item and the at least one other item of such items on the visual display component; tracking such items based on timing of actions involving such items, where the timing includes: i) a present time period corresponding to items being active at a particular time, ii) a past time period corresponding to items being active prior to the particular time and are inactive at the particular time, and iii) a future time period corresponding to items being in active at the particular time and will be active after the particular time passes; and interacting with each item of such items via the visual display component so that: i) each item behaves as if being in a native computing environment, and ii) a second execution of the native computing environment as an entire native program in parallel with the graphical user interface is avoided.

BRIEF DESCRIPTION OF THE DRAWINGS

The present invention can be further explained with reference to the attached drawings, wherein like structures are referred to by like numerals throughout the several views. The drawings shown are not necessarily to scale, with emphasis instead generally being placed upon illustrating the principles of the present invention. Further, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

DETAILED DESCRIPTION

Among those benefits and improvements that have been disclosed, other objects and advantages of this invention will become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention which are intended to be illustrative, and not restrictive.

Throughout the description, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope and/or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and dynamically. As used herein, the term "real-time" means that an event/action can occur instantaneously and/or almost instantaneously in time when another event/action has occurred.

As used herein, the term "dynamic(ly)" means that an event/action that can occur without any human intervention. In some embodiments, the event/action in accordance with the present invention can be in real-time, hourly, daily, weekly, monthly, etc.

As used herein, the terms "app" and "apps" refer a single or a plurality of computer software programs.

In some embodiments, the instant invention provides synchronized single-action graphical user interfaces for assisting an individual to uniformly manage computer-implemented activities utilizing distinct software (e.g., apps) and distinct types of electronic data, and computer-implemented methods and computer-based systems utilizing such synchronized graphical user interfaces.

Figure 1:
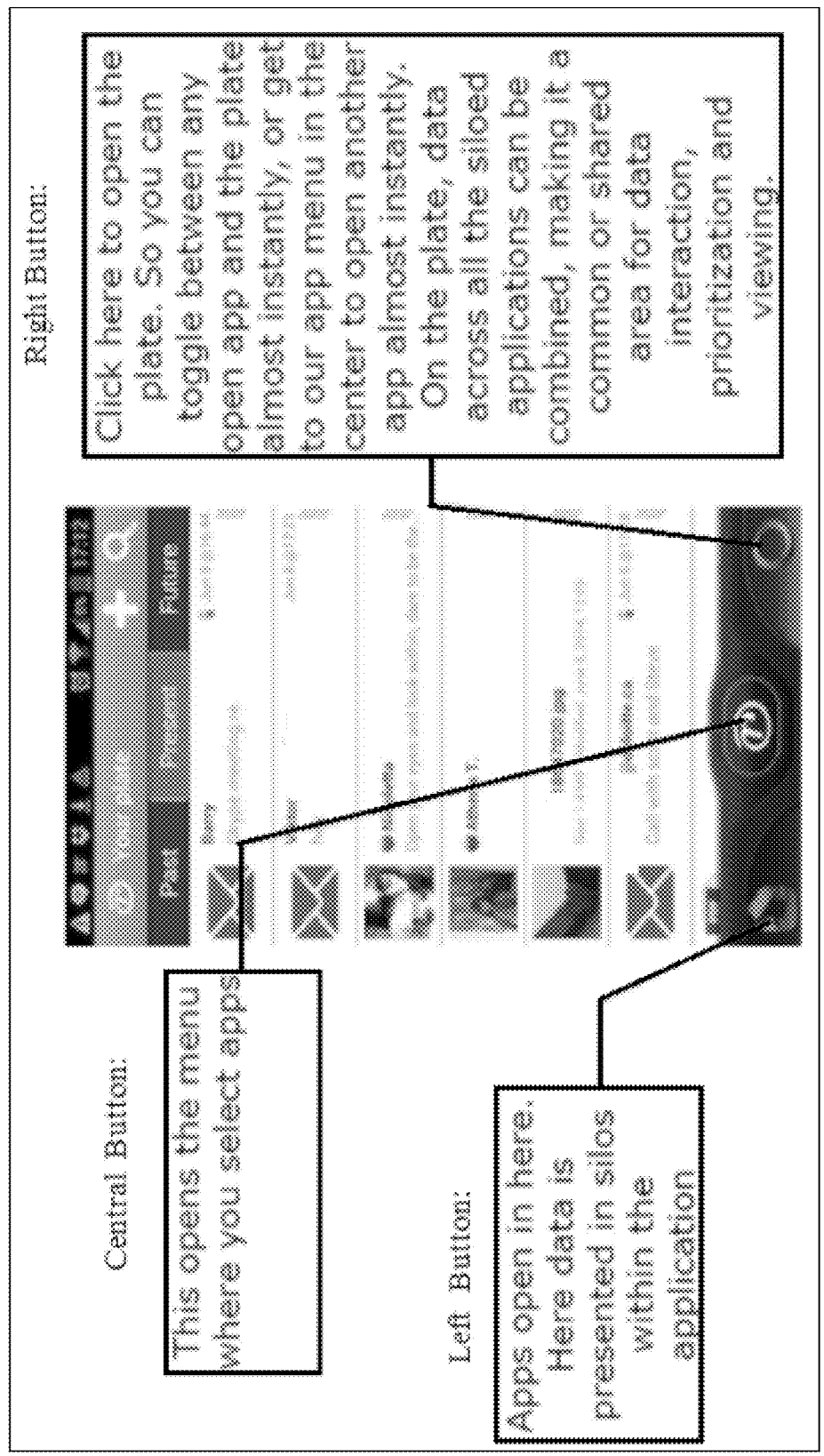
FIGS. 1-20 show screenshots depicting certain aspects of the present invention in accordance with at least some embodiments.

In some embodiments, as shown in FIG. 1, a synchronized single-action graphical user interface, which is a cross application data workspace, can be in a form of a single programmed user interface, also referenced herein as the "plate" or "Plate" which can be configured to at least:

1) display data from distinct/different applications, and/or 2) allow an individual, utilizing the single action, to perform activities through distinct/different applications (e.g., mobile apps) and/or with distinct/different types of data.

For example, as detailed herein, any digital object and/or data (e.g., from inside and/or outside of a particular application) can be added to the plate such as a file, a contact, a task, an email, a tweet, a map, an entire application (e.g., a calculator), etc. Further, in accordance with the inventive principles detailed herein, on the inventive plate of the instant invention can be implemented across different platforms such as, but not limited to:

AmigaOS, AmigaOS 4
FreeBSD, NetBSD, OpenBSD
Linux
Microsoft Windows
OpenVMS
OS X (Mac OS)
OS/2
Solaris
Tru64 UNIX
VM
Android
Bada
BlackBerry OS
Firefox OS
iOS
Embedded Linux
Palm OS
Symbian
Tizen
WebOS
Windows Mobile
Windows Phone
Adobe AIR
Adobe Flash
Adobe Shockwave
Binary Runtime Environment for Wireless (BREW)
Cocoa (API)
Cocoa Touch
Java Platforms
JavaFX
JavaFX Mobile
Microsoft XNA
Mono
Mozilla Prism, XUL and XULRunner
.NET Framework
Silverlight
Open Web Platform
Oracle Database
Qt
SAP NetWeaver
Smartface
Vexi
Windows Runtime.

In addition, the different software platforms can have different/distinct graphical user interface implementations (e.g., a desktop, a web app., etc.).

In some embodiments, as detailed herein, the inventive computer-based systems utilizing the inventive synchronized graphical user interfaces (e.g., the Plate) are configured to allow to drag-and-drop objects on top of each other for a particular instant action, a particular future action, and/or a particular organization action. For example, as detailed herein, the inventive computer-based systems utilizing the inventive synchronized graphical user interfaces (e.g., the Plate) are configured to function so that each object becomes like a "folder" for other object(s). When it is time to take action, all relevant objects are on hand in the "folder." For example, the instant actions can be saved when a particular object is dragged on top of another, and run like a program at a future date. In some embodiments, as shown in FIG. 1, the plate can be considered an "app" by itself.

In some embodiments, any electronic mails, documents, contacts, etc. can be put on the plate by a single action of a user (e.g., swiping right/left, selection, hovering a cursor and/or a finger, etc.). In some embodiments, the plate functions like a to-do list and work management area and the data objects presented on the plate act as the "to-do" item rather than a text description. In some embodiments, for example, instead of an item being a text label saying "call John Smith", an inventive to-do list in accordance with the instant invention allows the user to actually put John Smith's contact object on the plate which allows to perform a call by simply clicking/selecting the "call John Smith" item on the inventive plate of the instant invention. Consequently, the "call John Smith" item in accordance with the instant invention is actionable, since when the user desires call "John Smith," the user saves a step of having to find "John Smith's" contact details.

In some embodiments, on the inventive plate of the instant invention, the user can take actions by dragging and/or dropping data objects onto each other. In some embodiments, for example, the user can drag an email on a person object representing a particular person and/or a group of people (e.g., "John Smith" contact object, "John Smith" profile object, etc) to forward the email instantly to a person and/or a group of people; and/or the user can drag a document on the person object to share such document instantly with the particular person and/or the group of people; and/or drag the document on a task, and then drag the task on the person object to share the task with the document attached to it with the particular person and/or the group of people, etc.

In some embodiments, the plate list of the inventive plate of the instant invention behaves like an action list, a work management area, a to-do list, and/or any combination thereof so that the user can have resources of data available to what s/he are working on/focusing on. In some embodiments, all applications (e.g., email, documents, contacts, projects, calendar, tasks, notes, intranet, links, tweets, etc.) interfacing with the inventive plate of the instant invention are programmed to have a functionality of utilizing a single motion/action to put a piece of data and/or action(s)/function(s) on the common plate area.

Figure 2:
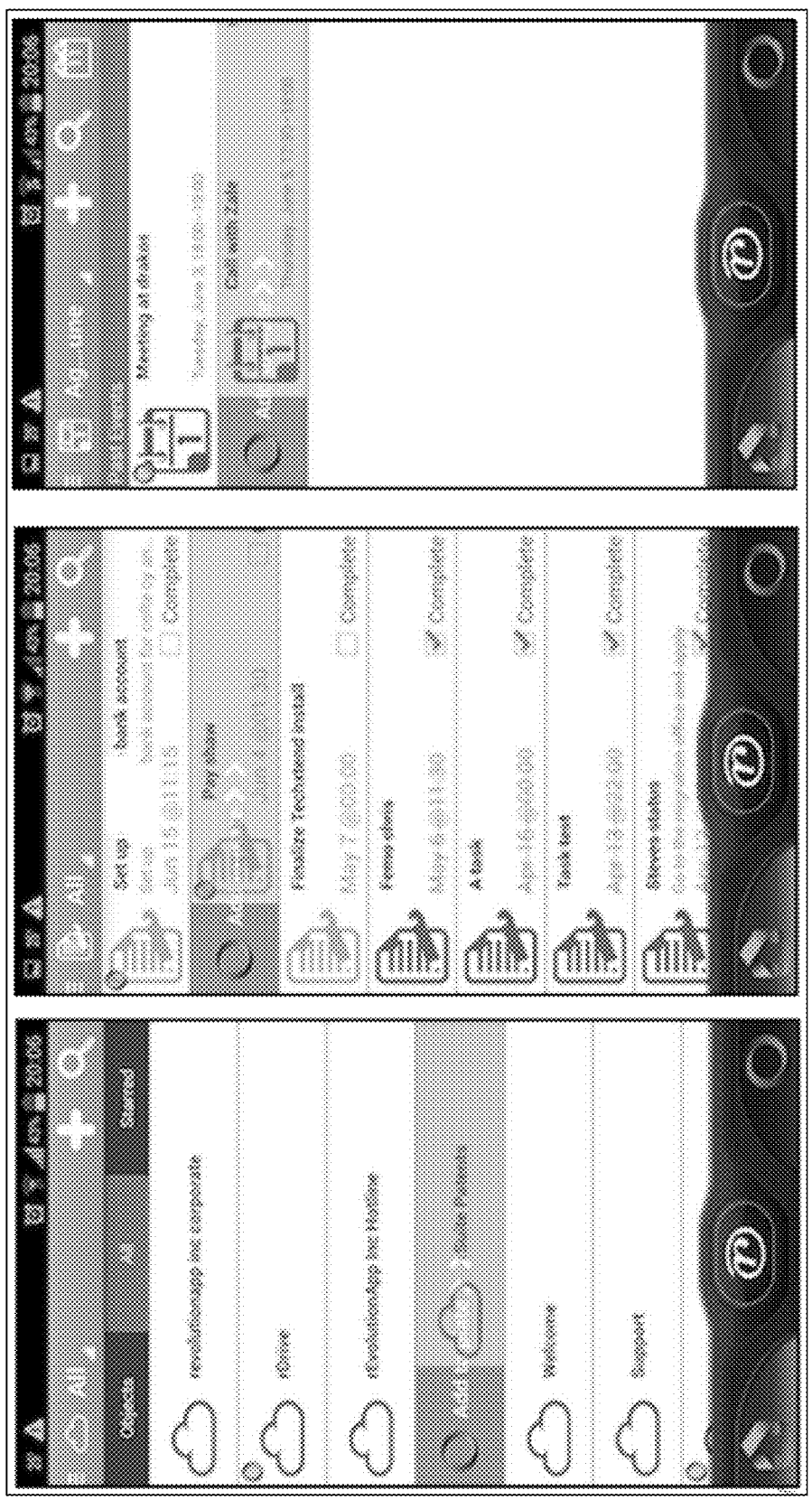

In some embodiments, as shown in FIG. 2, data and/or action(s)/function(s) from applications can be placed onto the inventive plate of the instant invention by having the user to perform a simple swipe to the right/left from any application. In some embodiments, the inventive plate of the instant invention can exhibit characteristics of a chronological list, by displaying what the user most recently put on the plate appearing first, so that such list is arranged in an order of the most recent list on the top and the plate can be broken down into, but is not limited to, three sections: the past, the present, and the future.

In some embodiments, As shown in FIG. 2, while by, for example, swiping an item (email, document, contact, tweet, app, map, etc.) to the right, with a single action, results in such item being placed onto the plate, if the user desires to act on such item quickly, the user can also, for example, swipe the same item twice (e.g., re-add the same item) which results in such item being placed to the top of the list. In some embodiments, once the item is on the plate of the instant invention, the item represents actionable data and/or functionality, allowing the user to, for example, but is not limited to, drill down into the item (e.g., view, edit, activate, share, etc.) without starting/opening particular application(s) which is/are native to the item and thus to continue interact within only the single application utilizing the same synchronized single-action graphical user interface of the instant invention without losing functionalities of the native application(s) (for purposes of this disclosure, the terms "native application(s)" and "native apps" are directed to software application(s)/functionalities/scripts/routines which have been specifically designed to process particular type of data, perform particular functions, offer particular functionalities to users, and/or any combination thereof; and have not been originally designed to interact with the inventive synchronized single-action graphical user interfaces of the instant invention (e.g., the inventive plate of the instant invention)). In some embodiments, the computer systems and computer-implemented methods of the instant invention allow the user to be where the user wants to be with the shortest amounts of actions.

In some embodiments, the computer systems and computer-implemented methods of the instant invention allow the user to work on different data, in the inventive plate area of the instant invention without exiting the inventive plate in order to reach out different/distinct applications to access different/distinct data. In some embodiments, the computer systems and computer-implemented methods of the instant invention allow many applications (e.g., mobile apps) to behave as one interconnected unit through synchronized single-action graphical user interface(s) of the instant invention. Consequently, in some embodiments, when the data and/or action item is placed on the inventive plate of the instant invention, the user does not sacrifice his and/or her ability to perform all various actions which s/he can perform with such data and/or action item in the native application(s) but instead the user gains visibility into the things that the user desires to focus on which can further be, for example, segregated into areas/sets of things based on, for example, a time factor identifying when the user has been focusing and/or will focus on items selected to the inventive plate (e.g., past, present, and future).

In some embodiments, items placed on the synchronized single-action graphical user interface(s) of the instant invention can have uniform size and viewing structure in a list view and a detail view (e.g., header, action bar, body) when the user drills into an item in the list view.

In some embodiments, the synchronized single-action graphical user interface(s) of the instant invention can be divided in to "to-do" sections/lists which can be arranged on time-basis, relevant-focus-basis, and/or any combination thereof (e.g., Past, Present and Future). In some embodiments, each "to-do" section, which is arranged on the relevant-focus-basis, can be configured to present/maintain things (e.g., documents, messages, data, actions, etc.) based on what the user desires to focus on, irrespective of the particular time period. For example, with respect to an example having areas of Past, Present and Future, as shown in FIG. 3, the "Present" area can display things that the user desires to focus on presently, irrespective of particular time; then the "Past" area will list items that are associated with things/tasks that the user is no longer focusing on, and the "Future" area will list items that are associated with things/tasks that the user desires to focus on next after the user is done focusing on things that are residing in the "Present" to-do list/tab.

In some embodiments, each "to-do" section can have a time-basis component and be configured to present/maintain things (e.g., documents, messages, data, actions, etc.) within a predetermined time period which can be a default timeframe and/or be customizable by the user. For example, with respect to an example having areas of Past, Present and Future, as shown in FIG. 3, the "Present" area can have a timeframe of a single day and/or just an hour; then the "Past" area will list items that are associated with things/tasks that were focused on by the user during the previous day, and the "Future" area will list items that are associated with things/tasks that the user will focus on (e.g., things due, tasks to be done, etc.) during the next day. In some embodiments, the "Past" area will list a number of items that are associated with things/tasks that user focused on last during the previous day. In some embodiments, the "Future" area will list items that are associated with things/tasks that the user will focus first during the next day.

In some embodiments, items from the "Future" area automatically transferred/added by the systems and the synchronized single-action graphical user interface(s) of the instant invention to the "Present" area on a predetermined date and/or time specified by the user when the user put the item into the "Future" area (e.g., in one example, when the user selects/designates the item for the "Future" area, the user is prompted to identify when to move the item to the "Present" area). In some embodiments, all items/objects in all views/areas of the synchronized single-action graphical user interface(s) of the instant invention are automatically transferred among all views/areas based on predetermined instructions associated with the items/objects. In some embodiments, the systems and the synchronized single-action graphical user interface(s) of the instant invention allow the user to move the item ad hoc to the "Present" area at any time by, for example, going into the "Future" area and swiping the object into the "Present" area.

Figure 4:
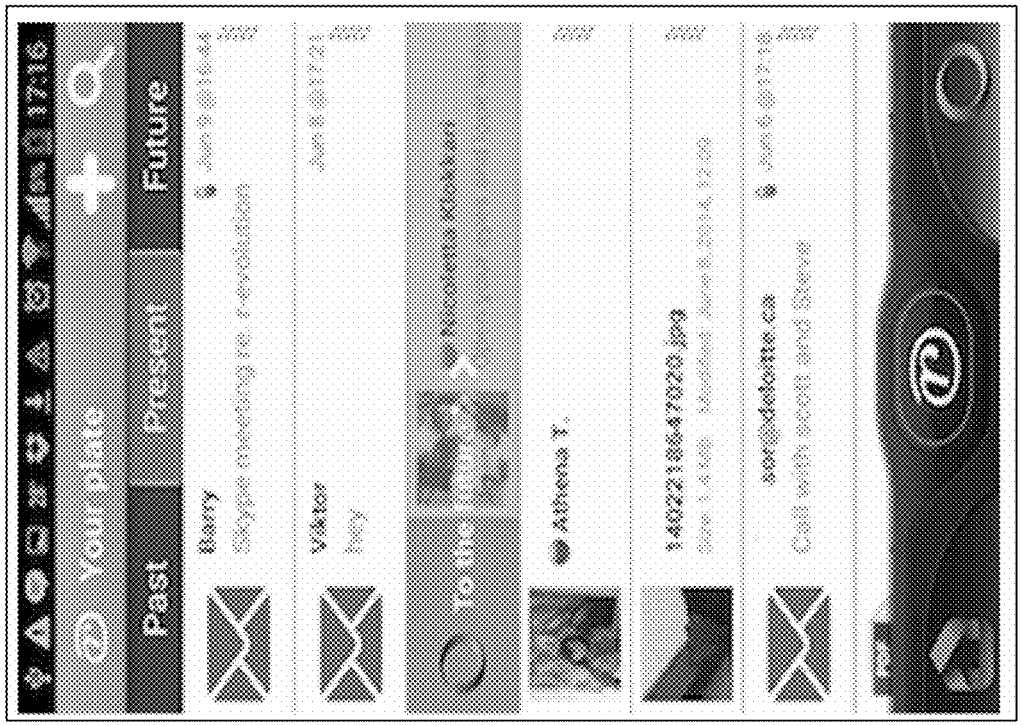
Figure 3:
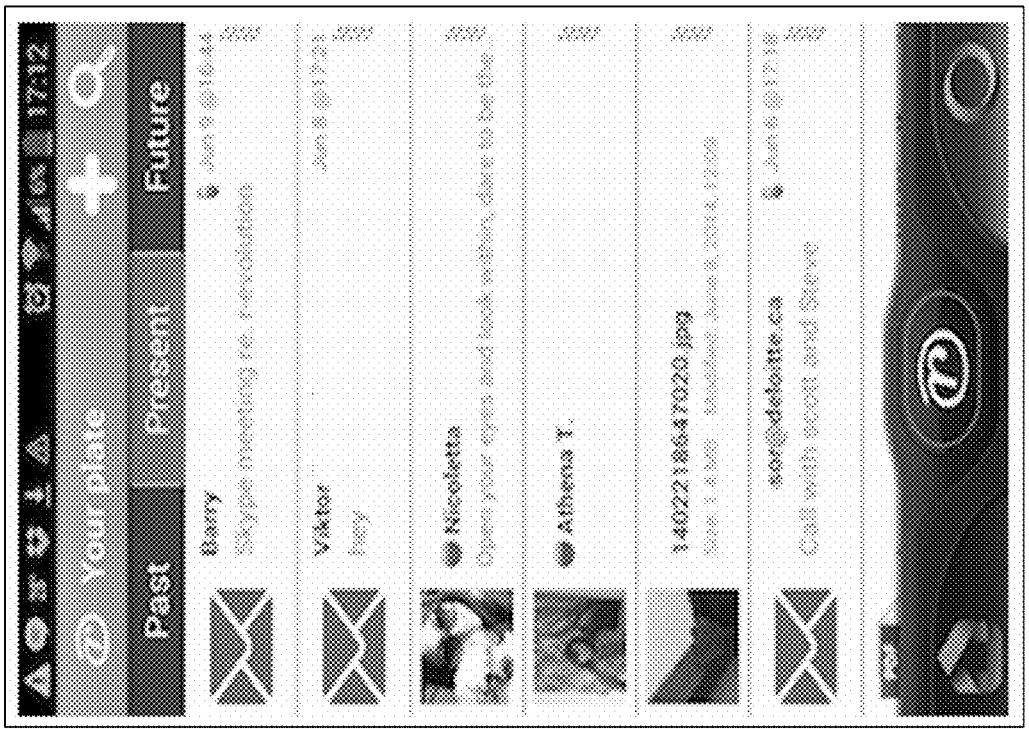

In some embodiments, as shown in FIGS. 3-4, the "Present" view/area of a synchronized single-action graphical user interface of the instant invention is an orderable list. In some embodiments, the user can arrange the order of distinct data items by dragging these distinct data items to a specific position of the "Present" view within the container of the same list.

In some embodiments, the "to-do" lists can be just a text list of things to do. In some embodiments, the "Past," "Present" and "Future" lists announce when things were, are, and/or will be due, allowing the user to focus on things beyond what is on the user's immediate schedule. In some embodiments, based on a predetermined condition/instruction, an item can be automatically removed by the systems and the synchronized single-action graphical user interface(s) of the instant invention from its original list (e.g., the "Present" view/area) and be moved to another list (e.g., the "Past" view/area).

In some embodiments, as shown in FIGS. 3 and 4, the user can toggle through the "Past", "Present" and "Future" areas/lists by, for example but not limiting to, swiping an item from the "Past" into the "Present," from the "Present" into the "Future," and/or from the "Future" into the "Present".

Figure 5:
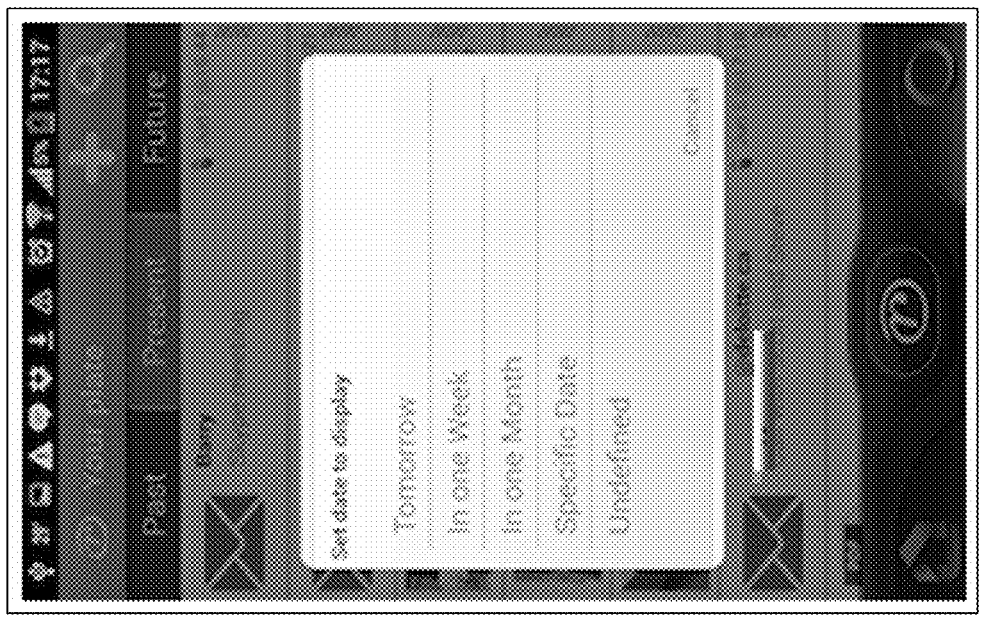

In some embodiments, as shown in FIG. 5, when, for example, the user swipes an item from the "Present" list/view/area into the "Future" list/view/area, the user can be prompted to identify where/when the user wants such item to reappear on the synchronized single-action graphical user interface(s) of the instant invention (e.g., the plate). In some embodiments, there can be a snooze button for data objects of different/distinct types.

In some embodiments, for example, things in the "Present" area/list/tab can be swiped to the left, bringing them to the "Past" area/list/tab as well things being brought to the "Future" area/list/tab through a swipe to the right. In some embodiments, for example, things brought into the future are brought there with the instruction of when the user will carry them out (e.g., in a few hours, tomorrow, in two weeks, month, etc.). In some embodiments, the computer systems and computer-implemented methods of the instant invention allow the user, utilizing programmed memory containers, such as the "Past"/"Future" areas/lists/tabs, to take different data objects/functionalities (e.g., email, documents, contacts, tasks, calendared items, etc.) and "snooze" it (e.g., place different data objects/functionalities in the system memory (e.g., DRAM, flash memory, remote servers, etc.) to be rapidly accessed by the computer device when it needed) while still keeping the user's focus as to what is there. In some embodiments, the computer systems and computer-implemented methods of the instant invention can automatically put data on the plate intelligently (e.g., for example, the user's next scheduled appointment is automatically moved onto the plate since, intuitively, the user wants to know what is next on the user's schedule). Consequently, having the user's next scheduled appointment show up on the plate saves the user additional time to find the same information on the calendar and minimizes the user's need to remember to look at his calendar.

In some embodiments, the synchronized single-action graphical user interface of the instant invention (e.g., the plate of FIG. 1) is an area where data from different applications can be added from a single action within that application. For example, in some embodiments, when the user is in the email application, with a single action (e.g., but not limited to, swiping to the right), the user can add an item to the plate, which serves as a container of actionable data that the user can focus on.

In some embodiments, the inventive systems and methods of the instant invention allow the plate to receive, automatically and/or though the user's interaction, items from a list of things that the user could have been doing, and identifying them as the things that the user is choosing to focus on in the present and the present is not defined as an exact time, it's just relevant now.

In some embodiments, the computer systems and computer-implemented methods of the instant invention allow the data of the inventive "to-do" list to be actionable, resulting in the shortened number of steps to accomplish a particular task. For example, the user can drag the contact John Smith onto the plate, which is an obvious suggestion that the user needs to be interacting with that person, that might be a reminder to yourself "call this person today," but this detail is not necessary as you merely have to drag the contact on the inventive plate, which ensures the user will carry out the task that the user sets for herself and/or himself. In another example, similarly, the same scenario applies for an email, rather than taking a note "I have to reply to this a certain email with a specific document after reviewing it," the user can just drag the email and the document onto the plate for later review, interaction and association via drag and drop (e.g. dragging the document onto the email to initiate a reply to the mail with the reviewed document attached). In some embodiments, the user can also add a description in order to not confuse herself and/or himself on what task the user has to carry out (e.g., with contact John Smith). In one example, adding description can be accomplished by flipping over the data object and taking a note on what task the user needs to carry out (e.g., "call John Smith"). The fact that the note exists on the "back" of the object is evident from a visual indicator on the front. In some embodiments, for example, since a synchronized single-action graphical user interface of the instant invention (e.g., the inventive plate) can be directed to be the focus-based, when moving a calendar appointment for a particular task from a future date to the plate does not result in corresponding change in the date/time of such calendar appointment to advance the date/time of the task execution to the present; but instead, placing the calendar appointment of the particular task on the plate it serves just an indication that the user needs to focus on it now (e.g., preparing for the meeting), irrespective that the task is due sometime in the future. In some embodiments, in the inventive plate, the task(s) do/does not necessarily have to be done—the inventive plate can by-pass time, by, for example but is not limited to, tasks on the plate can slide from and into the "Past" and/or Future." Areas/tubs/lists.

Illustrative Examples of Some Embodiments

Actions with the Inventive Single-Action Graphical User Interface (e.g., the Plate)

Figure 6:
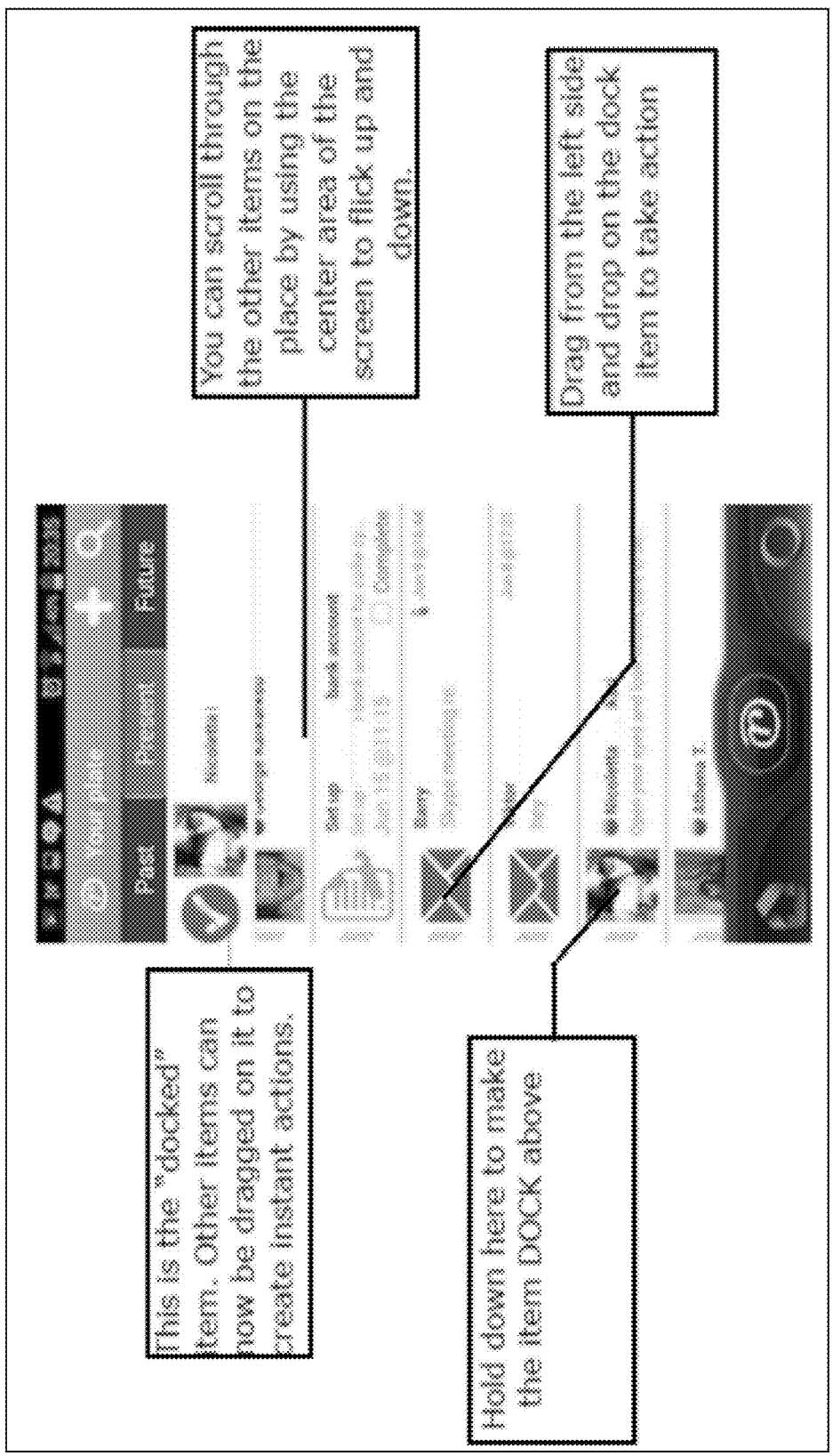

In some embodiments, as shown in FIG. 6, objects are required to be "docked" on the top of a screen. In some embodiments the top "docked" methodology allows the user to scroll up and down to find the other items that the user might want to drop on it which are already on the plate. In some embodiments, to dock any item, the user can, for example but is not limited to, simply hold down on the left side of the item and the item then is displayed in the dock, by, for example, replacing what is already on the dock if anything was there previously.

In some embodiments, the computer systems and computer-implemented methods of the instant invention provide ability to drag any data object on any other data object to create an action. For example, by dragging a document onto a person-related item (e.g., an icon representing person's contact entry) can prompt the user to do what the user is supposed to do regarding such person and the document and/or results in a synchronized single-action graphical user interface of the instant invention causing a first available action, such as electronically and automatically/dynamically communicating (e.g., transmitting, emailing, sharing without emailing, sending a link, SMS texting (e.g., if there is a phone number available, the program will text (e.g. send a SMS message to) the person with a link to the document).

In some embodiments, the synchronized single-action graphical user interface(s) of the instant invention allow(s) the user to select (e.g., click, press/holding down, etc.) a single data object, and that object rises to the top of the screen and docks itself which means the object stays at the top of the screen while the user scrolls other items up and down and/or from one side to the other side of the screen (for example, the user wants to share information with John Smith so the user docks an icon representing John Smith by holding down on the left side of the plate). Thus, for example, a single action causes a data object to dock to the top of the screen and stay there in position, so now the user can scroll down through the list and find another document that the user wants to put on the selected data object and the user drags and drops it (for example, by holding down on the left and dragging the item and dropping it on the docked item onto the specified data object). In some embodiments, scrolling can be programmed to be done by touching the middle of the screen, if the user scrolls up and down in the middle of the screen, the list scrolls but if the user moves the motion to the left of the screen, then such action results in drag and drop. In some embodiments, the right side of a synchronized single-action graphical user interface of the instant invention can be utilized for the user to order the list.

Illustrative Examples of Various Action Modes Associated with Synchronized Single-Action Graphical User Interfaces of the Instant Invention Lightening (Default Action) Mode In some embodiments, when the user, for example but not limited to, drag and drop a data item on the plate onto the "docked" item, an action is instantly taken. For example, dragging a document on a docked contact results in the document being shared with that contact via the best available method (e.g., direct sharing to contact's Drive location, email, text with a link, etc.). In another example, if the user drags an email on a person, the computer systems of the instant invention can forward that email instantly with no typing and/or other action from the user.

Prompt Mode

Figure 7:
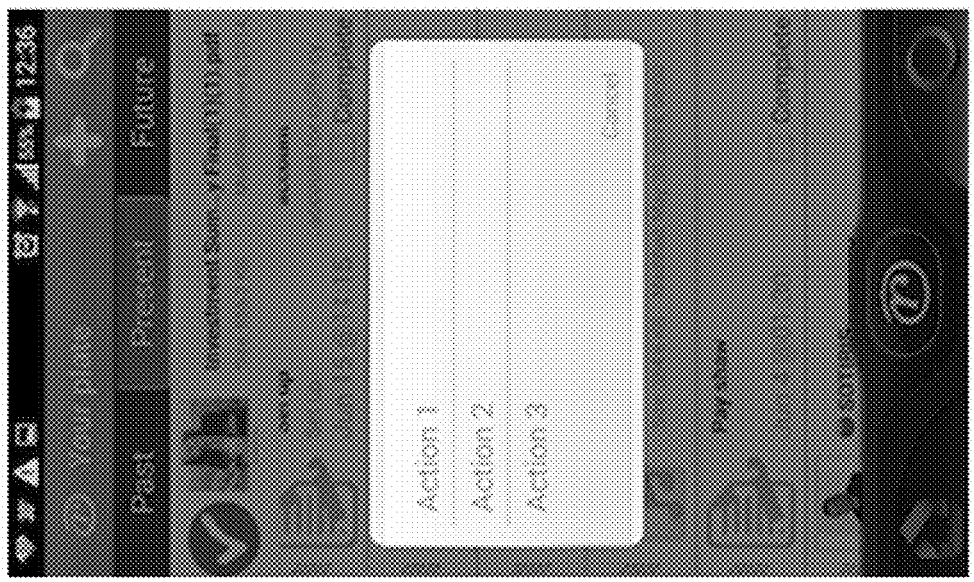

In some embodiments, the user can select a "prompt mode". In some embodiments, in the prompt mode as, for example, shown in FIG. 7, the synchronized single-action graphical user interfaces of the instant invention (e.g., the plate) is programmed to generate a prompt (instead of performing the default action(s) automatically) to the user asking to select particular action(s) from a list of possible actions. For example, the list of possible actions can be:

1) pick a particular email address of a recipient from the list of email addresses recorded in contact entry for that recipient, 2) select whether the user is trying to associate the file with the person rather than share the file with the person, and/or 3) offer all actions possible within the logic of the underlying associations in the system.

In some embodiments, in the lightening (default action mode), the user can set a timer as to how long is passed before the default action is performed by the systems of the instant invention, so that, for example but not limited to, the user can drop a document to John and the plate automatically sends the document to him/her, but if the user needs to carry out, for example, six more actions but the user has not carried out those actions, the prior to expiration of the set time, the synchronized single-action graphical user interfaces of the instant invention system generate a list of those six actions so that the user can select particular action(s) from the list.

Ordering Items from Different Applications on the Plate

In some embodiments, the systems and the graphical user interfaces of the instant invention of the instant invention are configured to obtain data from different applications, display the data in a uniform manner on the plate, and allow the user to drag and drop order this list for, for example but not limited to, priority and/or move things into "Past," "Present," and/or "Future" lists. In some embodiments, to order the list, the user, for example, simply drags the item from the right side and drop it where the user desires.

Figure 8:
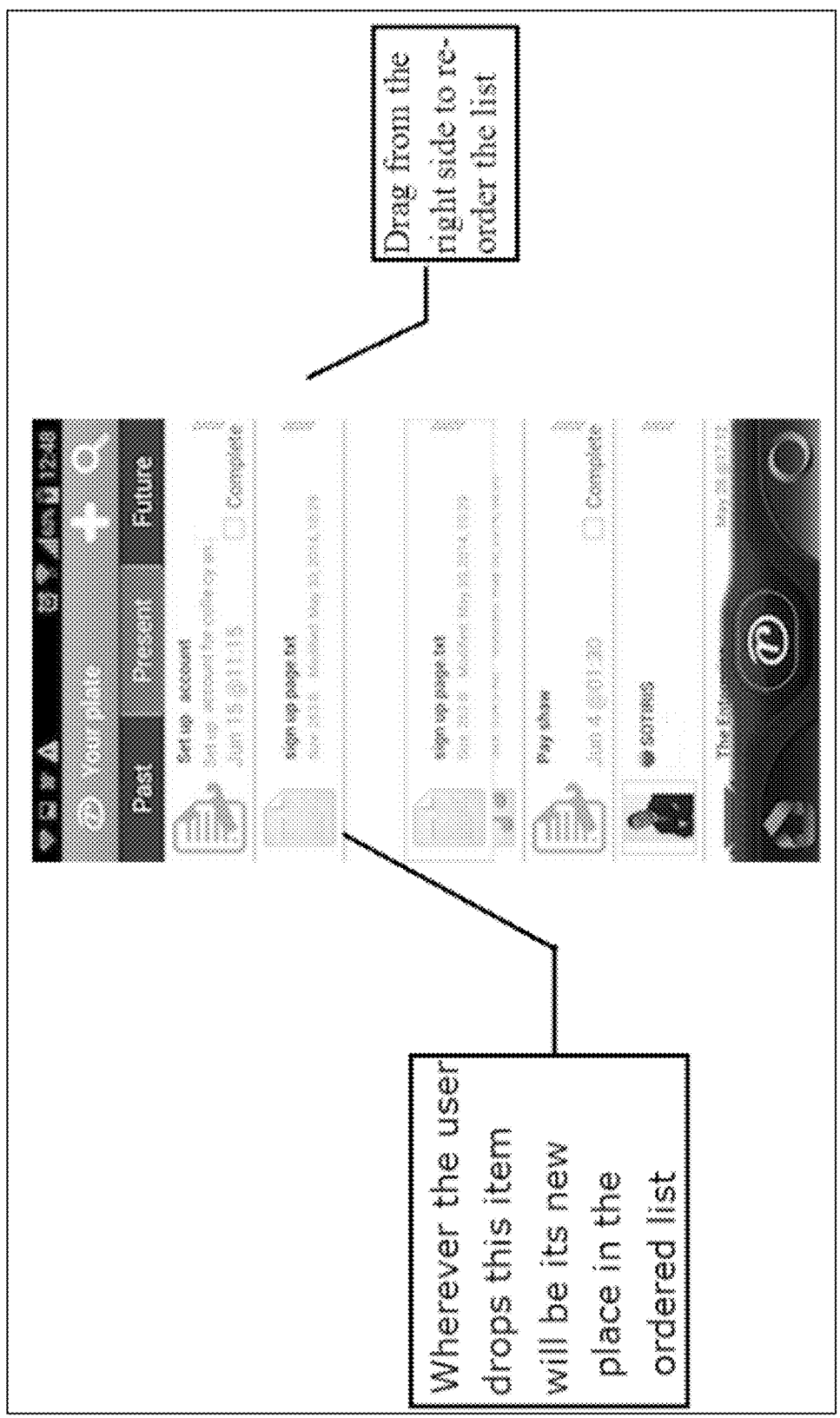

FIG. 8 illustrates an example of how the user is able to create a "focus" list, order, prioritize and/or manage that list in accordance with some embodiments of the instant invention.

In some embodiments, the systems and the graphical user interfaces of the instant invention are configured to allow the user to add a note to any data object on the plate (e.g., by clicking on the left). In some embodiments, an image of an object is shown to flip over so that the user is writing the note on the "back" of the object, and the front of the object can show an indicator as to whether there is a note and/or how many notes there are.

In some embodiments, the systems and the graphical user interfaces of the instant invention are configured to allow the user to start a discussion about any data object on the plate.

In some embodiments, the systems and the graphical user interfaces of the instant invention are configured to alert the user about communications that relate to any data object on the plate. For example, in some embodiments, the user can be alerted about communication(s) that relate to a data object on the plate by causing the plate icon to change its visual appearance (e.g., pulsing, change color, change shape, etc.) and/or produce a sound so that the user is being altered that there is some action relating to the plated item(s) (e.g., new email from someone on the plate, document transfer from someone on your plate, email related to a document on the plate, a new post in a collaborative discussion that is on the plate, cancellation of a meeting that is on the plate because it is coming up imminently, etc.).

In some embodiments, the systems and the methods of the instant invention are directed to representing a suite of applications (underlining applications, which can be related and/or unrelated among each other) which are connected at the data level, with a uniform interface, the plate, (e.g., a mobile app) having a unified navigational structure. In some embodiments, the applications are email, drive storage containers (e.g., documents storage locations), calendar, tasks, files, projects, contacts, notes, intranet (e.g., business social network) and the plate.

In some embodiments, the systems and the methods of the instant invention allow to work with data across applications both on the interface level and on the data level. In some embodiments, the uniform and unified interface of the instant invention is configured to allow the user, with a single action (e.g., one touch) to discover relationships between data from applications (e.g., applications which are not necessarily designed to intercommunicate with each other). In some embodiments, on the plate, the user can take actions by, for example but not limiting to, dragging and/or dropping data objects (e.g., drag an email on a person to forward, drag a document on a person to share it, drag a document on a task then drag the task on a person to share the task with the document attached to it, etc.)

As detailed above, in some embodiments, the plate is a desktop area for data from different applications, forming a do list and cutting down steps for getting things done. In some embodiments, emails can be routed to any object on the plate so it acts as an inbox for related communications.

Figure 9:
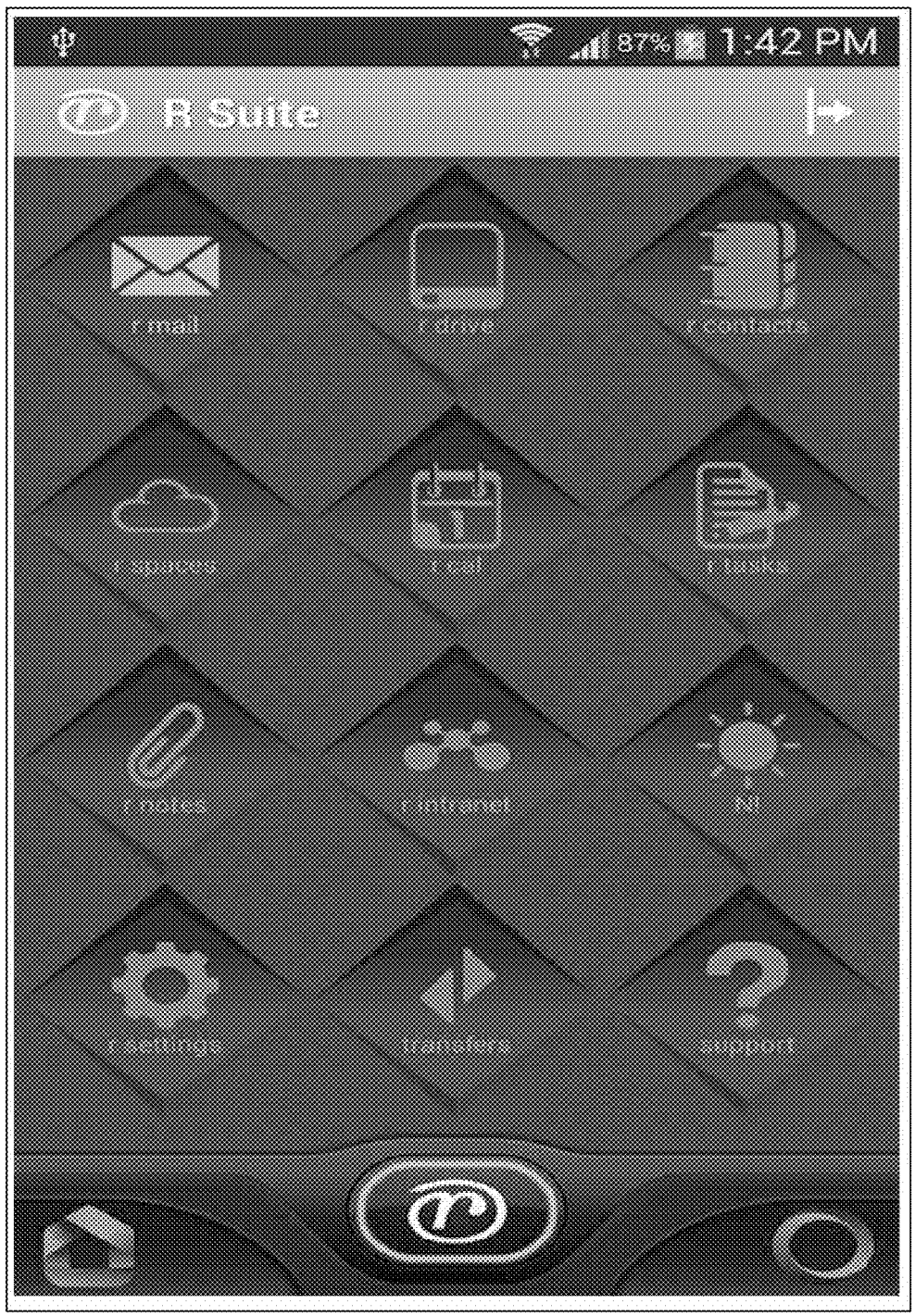

In some embodiments, the systems and the methods of the instant invention utilize one and/or more of the following functionalities and/or abilities to interconnect functions across apps (e.g., mobile apps, desktop apps, or both) with a uniform interface and navigation, and with contextual association of data:

1) selecting one and/or more keyboard keys (e.g., holding down the "+" key) to create a recording and automatically associate the recording with the object that the user is interacting with;

2) listening to an audio recording while browsing through different applications with ability to start and stop if from within each application;

3) a global notification of all messages within the system of the applications (e.g., unified alert system for all messages related to applications running on, for example, a particular mobile device);

4) a notification of priority data with different colors for different levels of urgency;

5) an ability to notify about important communications that are related to a data object while interacting (e.g., viewing) that data object;

6) selecting a menu button (e.g., holding down a menu button) to get to global notifications from all apps in one place;

7) using, for example but not limiting to, a combination of click, slide and/or hold on different parts of an object in a list view to create different interactions with that object in a uniform way across multiple applications—different parts of the objects creating different actions with:

a) for example, clicking on a left side of any object to initiate discussion around it, b) holding down a left side of an email object to get options related to that email (e.g., view all from contact(s) listed in the "from filed," view a thread), and/or c) filtering within full-text search results;

8) dragging any data item to the plate with a single uniform motion (e.g., swiping right, swiping left, etc.);

9) dragging objects on top of other objects to automatically create actions and/or relationships of data;

10) predetermined navigational frameworks (e.g., for a mobile device: a bottom left button invokes an app area, a center button invokes a menu, a bottom right button invokes the plate area, etc.);

11) ability to change "+" menu in each section with multi actions;

12) having note(s) that automatically go to a notes area that is contextually related to object(s) discussed in the note(s);

13) having a singular button (e.g., "rSearch," "R" button shown on FIG. 9) to be assigned to cause, when selected (e.g., holding down the button), an action of returning all related data related to a selected object;

14) initiating, maintaining, and supporting both threaded and WhatsApp-style non-threaded discussions (e.g., utilizing predetermined blend of discussion styles and how to jump back and forth between them, etc.) (in one example of threaded messaging, the messages are threaded together so that a user may see where a discussion begins and where it ends; in one example of non-threaded messaging, the messages appear based on the time they are posted, in a linear fashion and not underneath the message being responded to);

15) programmed a particular button (e.g., a bottom left button shown in FIG. 9) to produce varying flashes depending on message type and/or importance;

16) displaying a message count anywhere (i.e., throughout all interactive experience) when the object is related to collaborative discussions, emails and/or notes; and 17) allowing to initiate and/or join any conversation on any object with multiple participants.

In some embodiments, the systems and the graphical user interfaces of the instant invention of the instant invention (e.g., the plate) are configured as a place to display representations of and/or store data objects from any app with API accessible data (e.g., a contact, a cloud/space, an event, a document, a task, an email, etc.). In some embodiments, the user can act on that item on the plate in the same way as you can within the native application. In addition, as discussed herein, in some embodiments, the user can order the list on the plate (e.g., by holding down and then dragging and dropping to order). In addition, as discussed herein, in some embodiments, the user can "dock" item(s) on top. In addition, as discussed herein, in some embodiments, the user can associate objects on the list of the plate with other objects on the list by, for example but not limited to, dragging and dropping from the left side. As discussed herein, in some embodiments, when the user drops something on something else, the systems and the graphical user interfaces of the instant invention of the instant invention are configured to automatically associate the dropped object(s) with the destination object(s) and/or query the user if s/he desires to take other actions (e.g., "Would you like to send this file to John?"). As discussed herein, in some embodiments, in an association mode (for example, the association mode can be activate by, for example but not limited to, holding down the "(r)" button, shown by a screenshot of FIG. 9, when the user interacts with the plate). As discussed herein, in some embodiments, in the association mode, the user can drag object(s) to the right side to initiate an immediate action, and/or to the left side if this is a multi-part association (e.g., dragging 3 documents to one person, and then initiating the action).

In some embodiments, the systems and the graphical user interfaces (e.g., the plate) of the instant invention of the instant invention are configured to allow the user to drag first data/object(s) to the plate, and then creating a shareable task by dragging other data/object(s) on the first data/object(s) to, for example, by adding due dates, making a particular pre-loaded data object shareable, etc.

In some embodiments, the systems and the graphical user interfaces (e.g., the plate) of the instant invention of the instant invention are configured to allow a full-text searching through many data objects from different applications with a link to open the data element in a single click.

In some embodiments, the graphical user interfaces (e.g., the plate) of the instant invention of the instant invention are configured to be a mobile client functioning as a single user interface for all hub activities.

In some embodiments, the systems and the graphical user interfaces (e.g., the plate) of the instant invention of the instant invention are configured to allow seamless integration with file sharing functions of native applications.

In some embodiments, the systems and the graphical user interfaces (e.g., the plate) of the instant invention of the instant invention are configured to offer a one consistent user interface for email, files, contacts, calendaring, and/or task management.

In some embodiments, the systems and the graphical user interfaces (e.g., the plate) of the instant invention of the instant invention are configured to integrate various mail servers, including, but not limiting to, Gmail, Yahoo, Microsoft Exchange, etc.

In some embodiments, the systems and the graphical user interfaces (e.g., the plate) of the instant invention of the instant invention are configured to utilize a converged object relationship engine via a JSON/REST API (also refereed herein as the "coRe" and/or "CORE") which can be deployed inside corporate firewalls and/or in the cloud (e.g., the Internet cloud).

Figure 10:
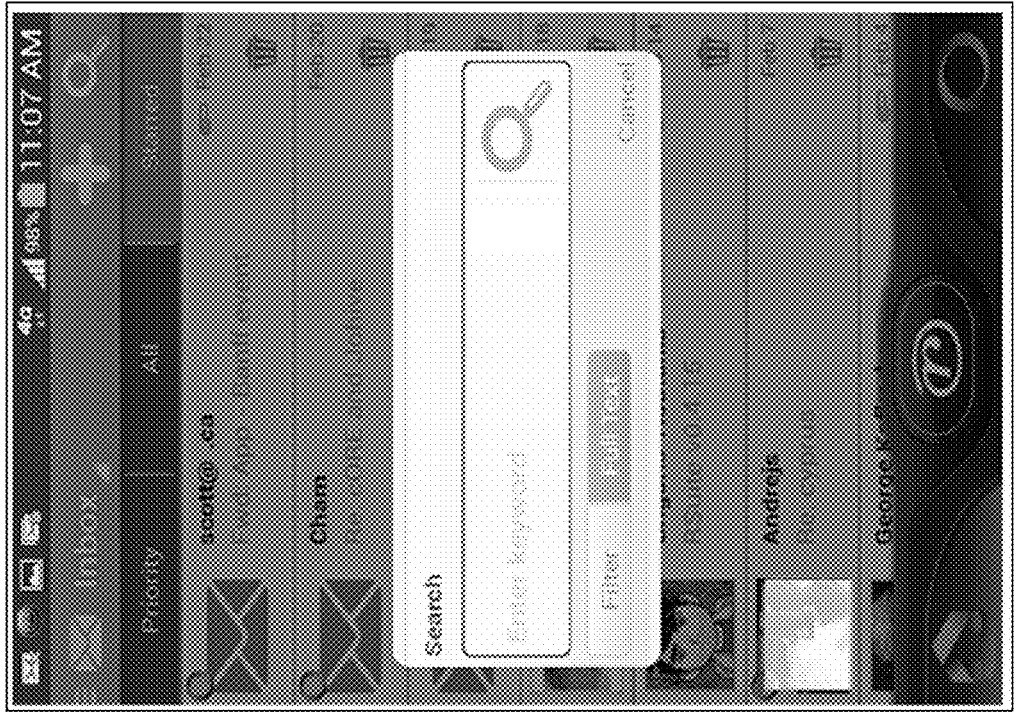

In some embodiments, as shown by a screenshot of FIG. 10, the systems and the graphical user interfaces (e.g., the plate) of the instant invention of the instant invention are configured to offer the full-text searching through any kind of data, including the user's data stored and/or viewable on a computer device (e.g., mobile device) and/or remotely.

Figure 11:
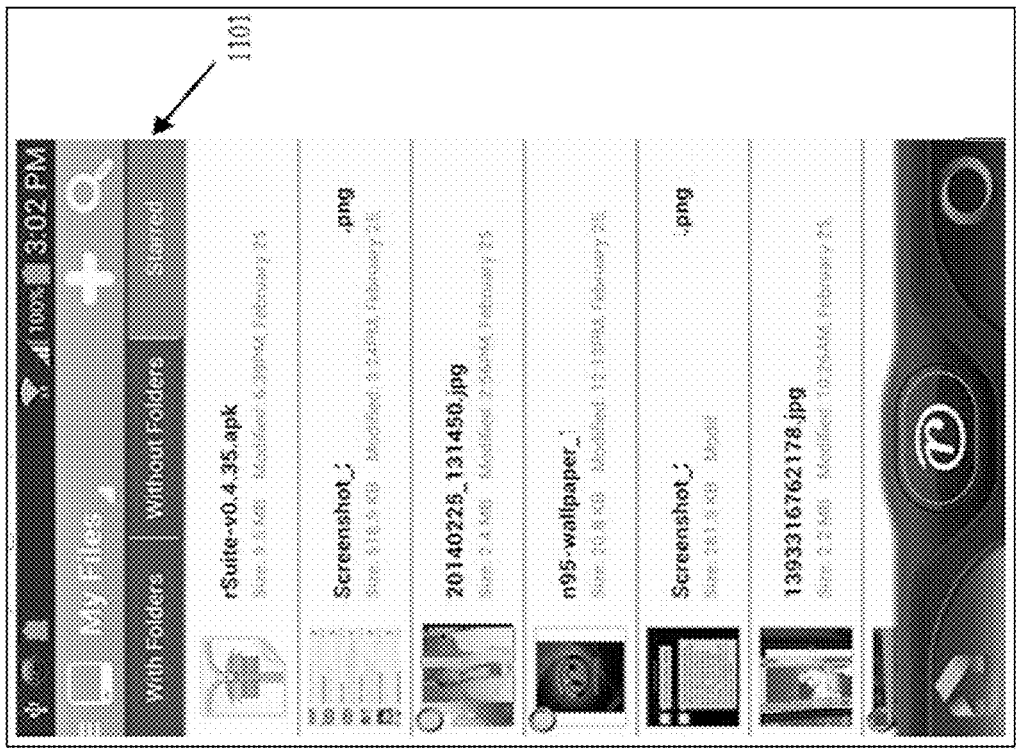

In some embodiments, as shown by a screenshot of FIG. 11, the systems and the graphical user interfaces (e.g., the plate) of the instant invention of the instant invention are configured to allow the view starred data from different applications in one list (as shown by item 1101).

Figure 12B:
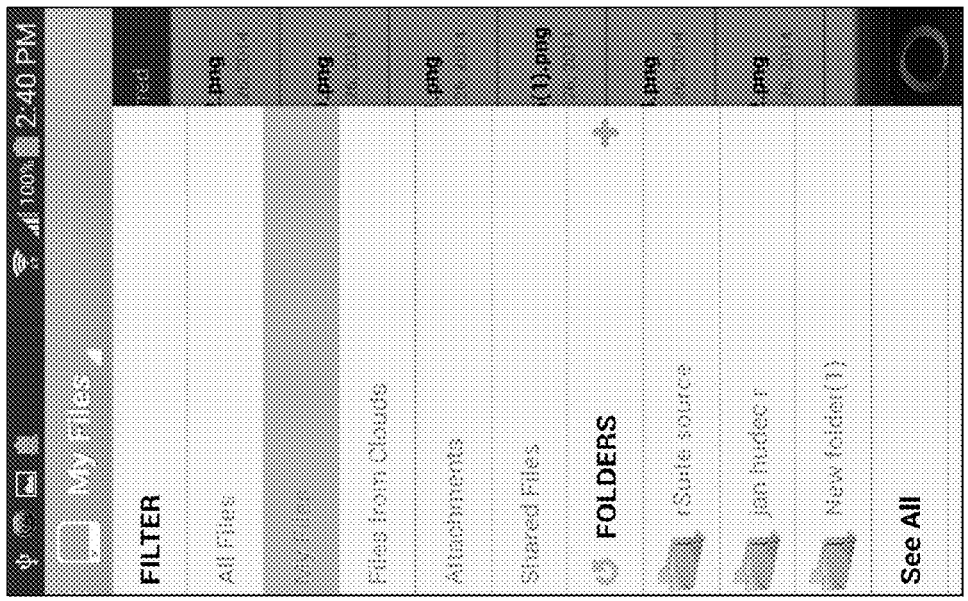
Figure 12A:
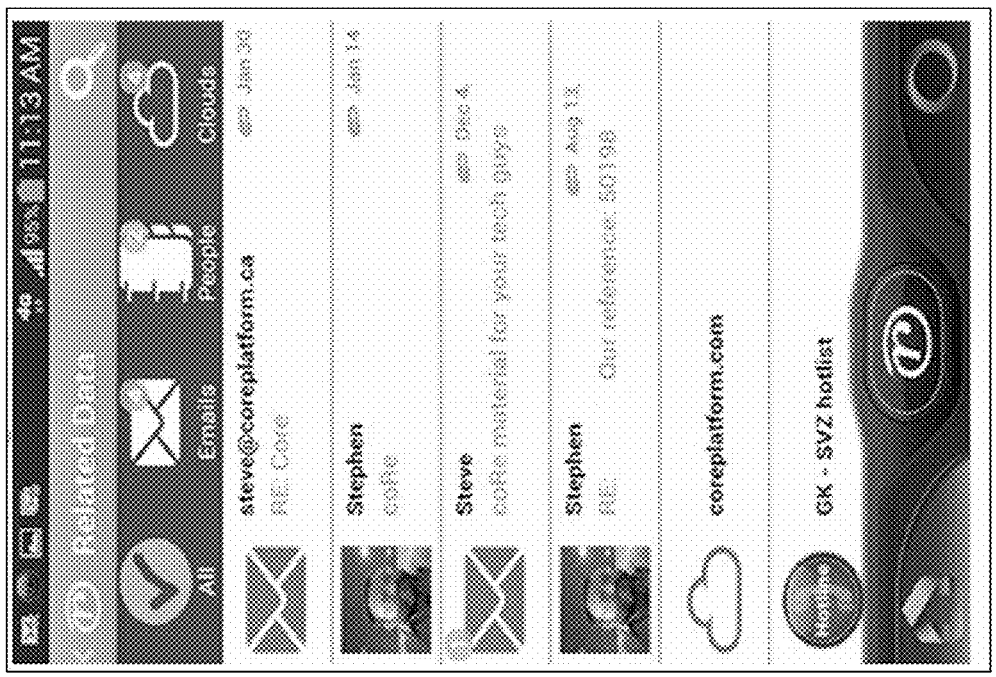

In some embodiments, as shown by a screenshot of FIG. 12A, the systems and the graphical user interfaces (e.g., the plate) of the instant invention of the instant invention are configured to allow the user to find data related to any data object, by, for example, clicking on the "(r)" button (1201).

Figure 12C:
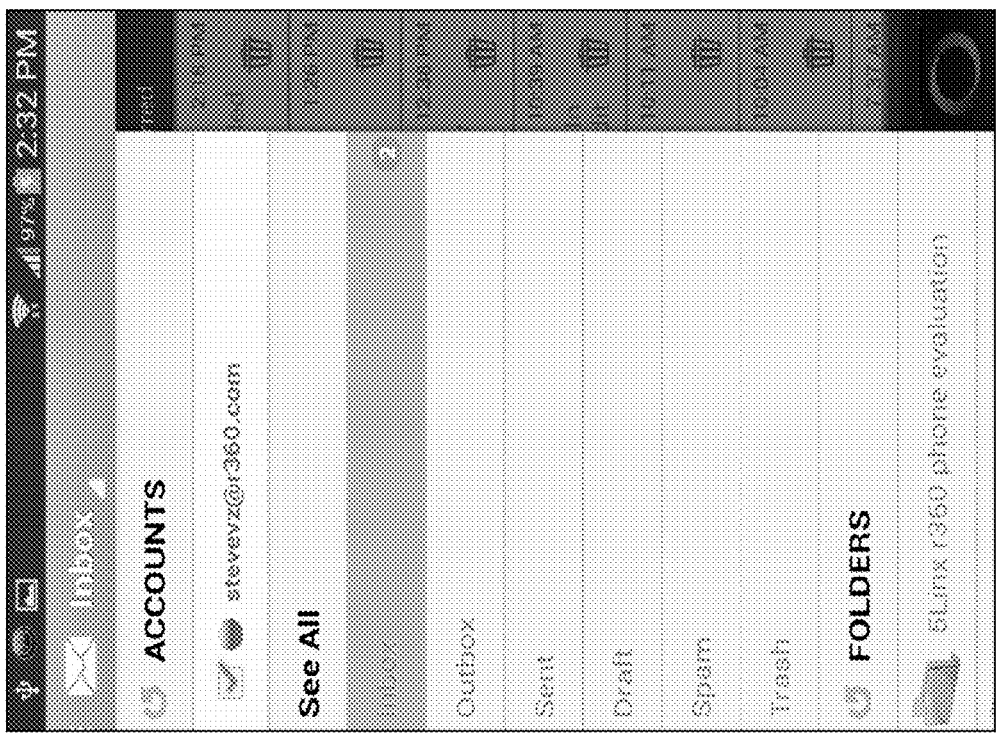

In some embodiments, as shown by screenshots of FIGS. 12B-12C, the systems and the graphical user interfaces (e.g., the plate) of the instant invention of the instant invention are configured to have a slide-out menu on the left to be consistent across all applications (for example, the menu for files has same look and feel as the menu for email).

Figure 13A:
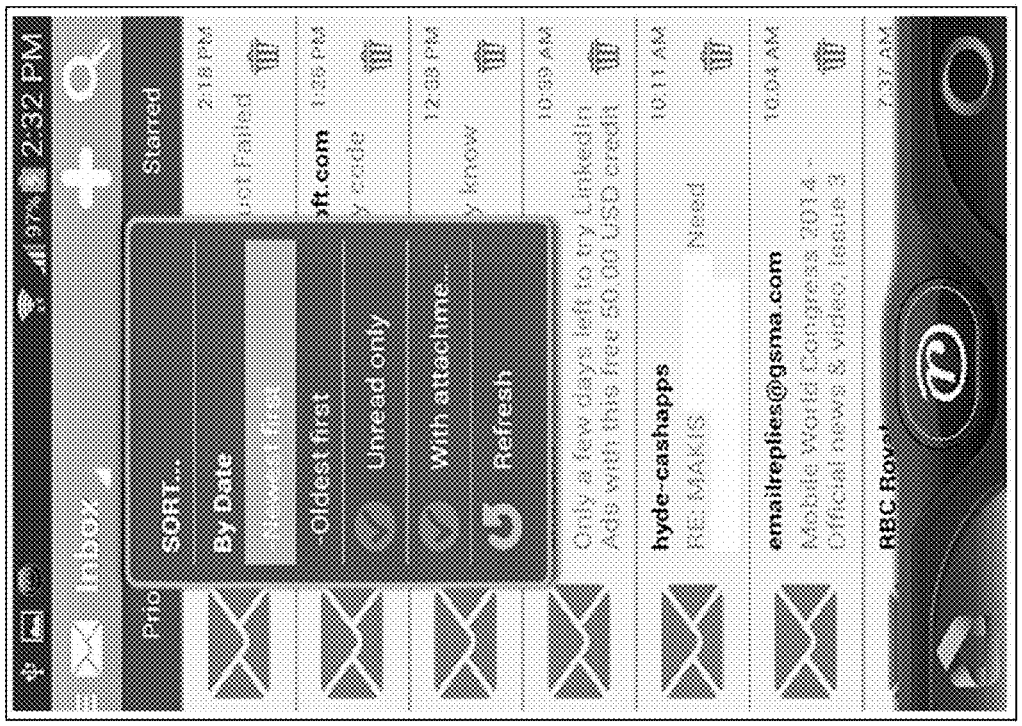
Figure 13B:
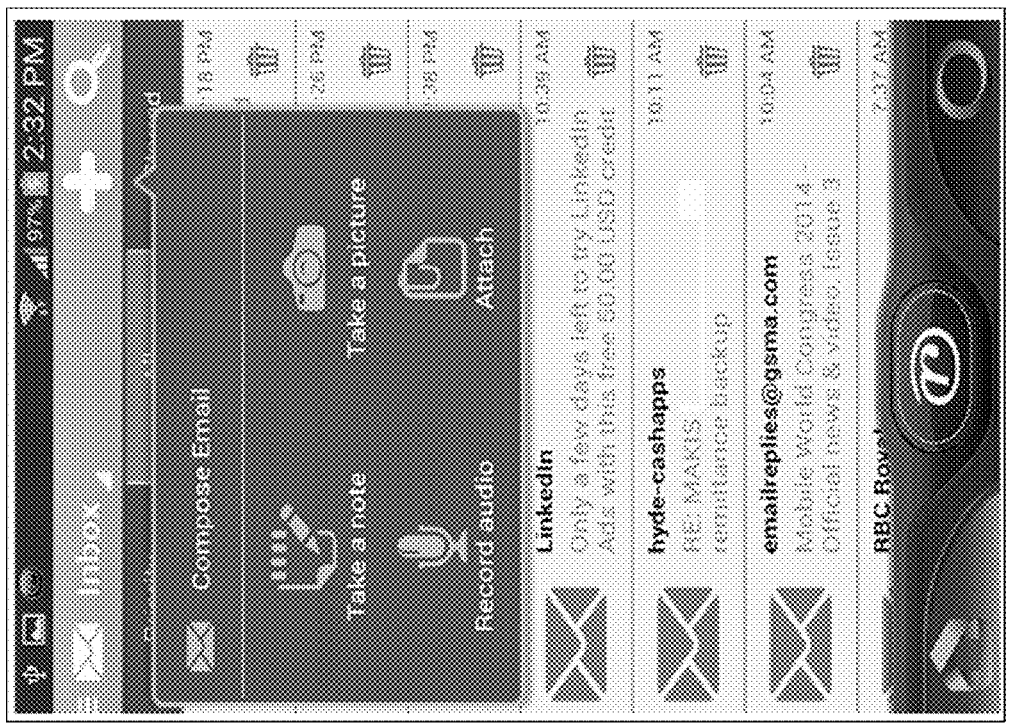

In some embodiments, as shown by screenshots of FIGS. 13A-13B, the systems and the graphical user interfaces (e.g., the plate) of the instant invention of the instant invention are configured to have drop-down menus that are always on the same place on the top, but the options within vary depending on what kind of data the user is viewing.

Figure 14:
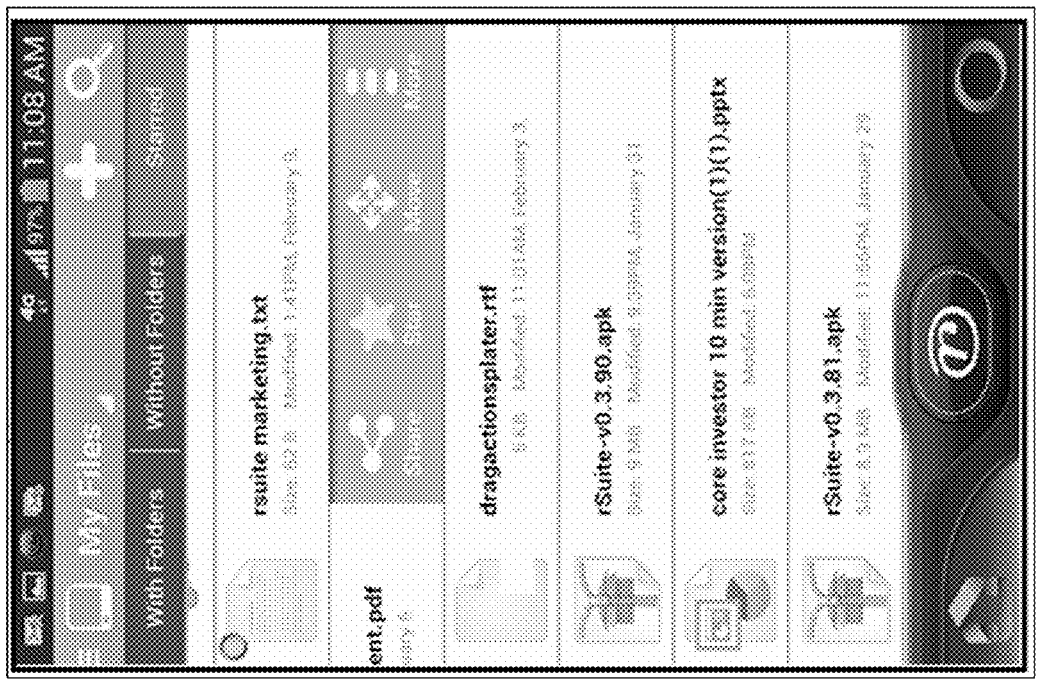

In some embodiments, as shown by a screenshot of FIG. 14, the systems and the graphical user interfaces (e.g., the plate) of the instant invention of the instant invention are configured to allow the user to swipe left on any object in any application to get an action menu.

Figure 15:

In some embodiments, as shown by a screenshot of FIG. 15, the systems and the graphical user interfaces (e.g., the plate) of the instant invention of the instant invention are configured to allow the user to share any type of data instantly and securely with a uniform process.

Figure 16:
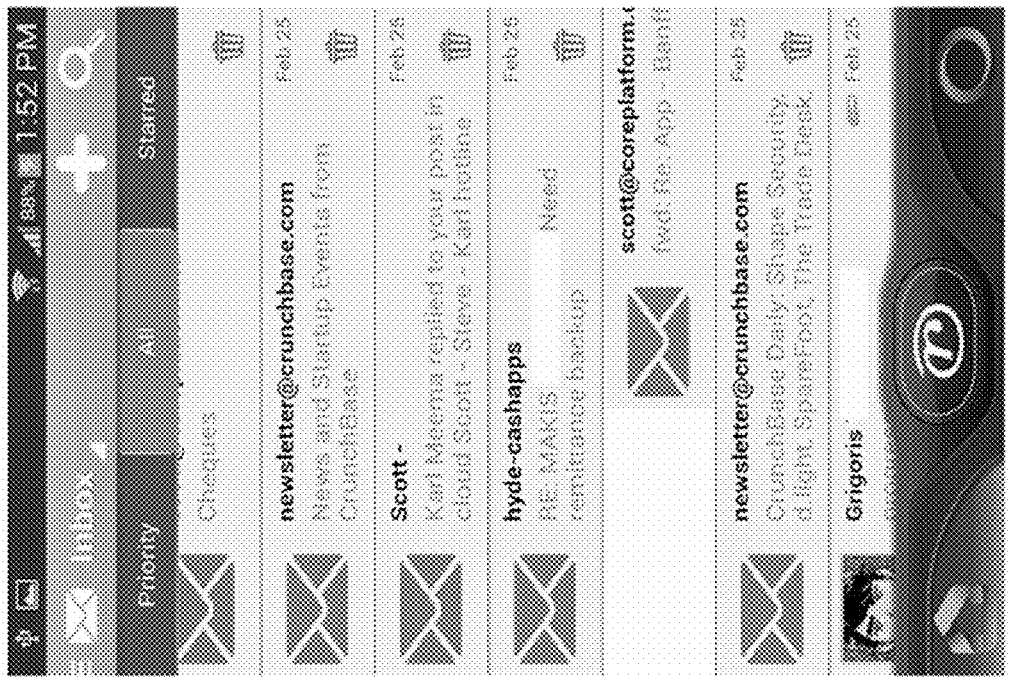

In some embodiments, as shown by a screenshot of FIG. 16, the systems and the graphical user interfaces (e.g., the plate) of the instant invention of the instant invention are configured to allow the user to swipe right to put any object on the plate.

Figure 17:

In some embodiments, as shown by a screenshot of FIG. 17, the systems and the graphical user interfaces (e.g., the plate) of the instant invention of the instant invention are configured to allow the user to click on the left side of any data item to instantly have a conversation about it and/or take a note about it.

Figure 18:
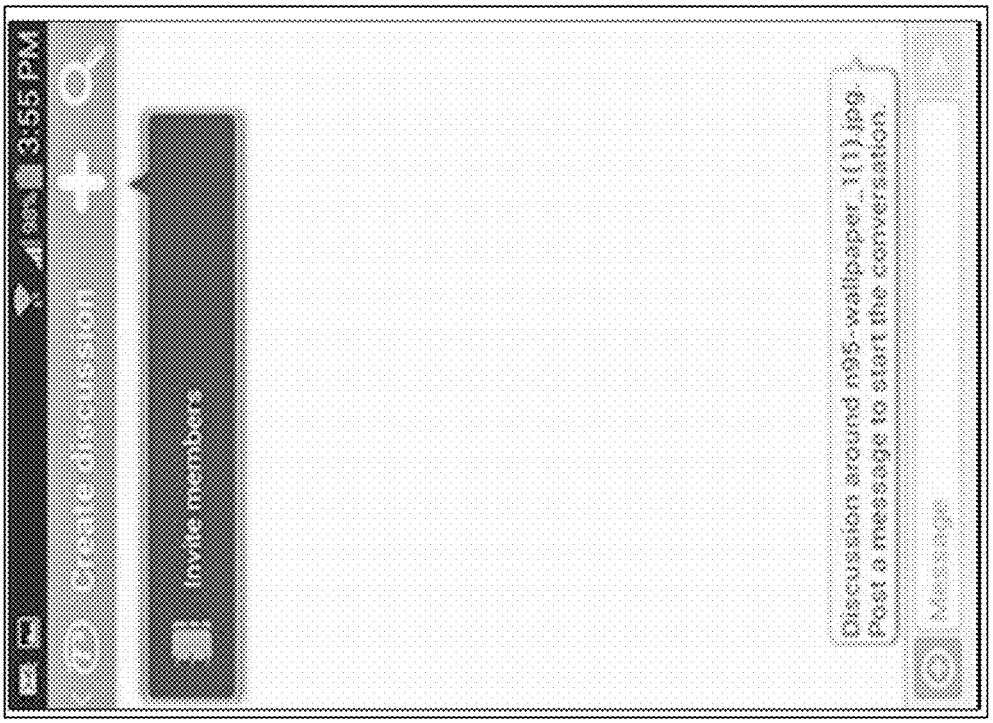

In some embodiments, as shown by a screenshot of FIG. 18, the systems and the graphical user interfaces (e.g., the plate) of the instant invention of the instant invention are configured to allow the user to invite any number of users (e.g., user(s) who also use the inventive system(s) and/or graphical user interface(s) of the instant invention) into a conversation about the data object with a link back to the data object itself.

Figure 19:
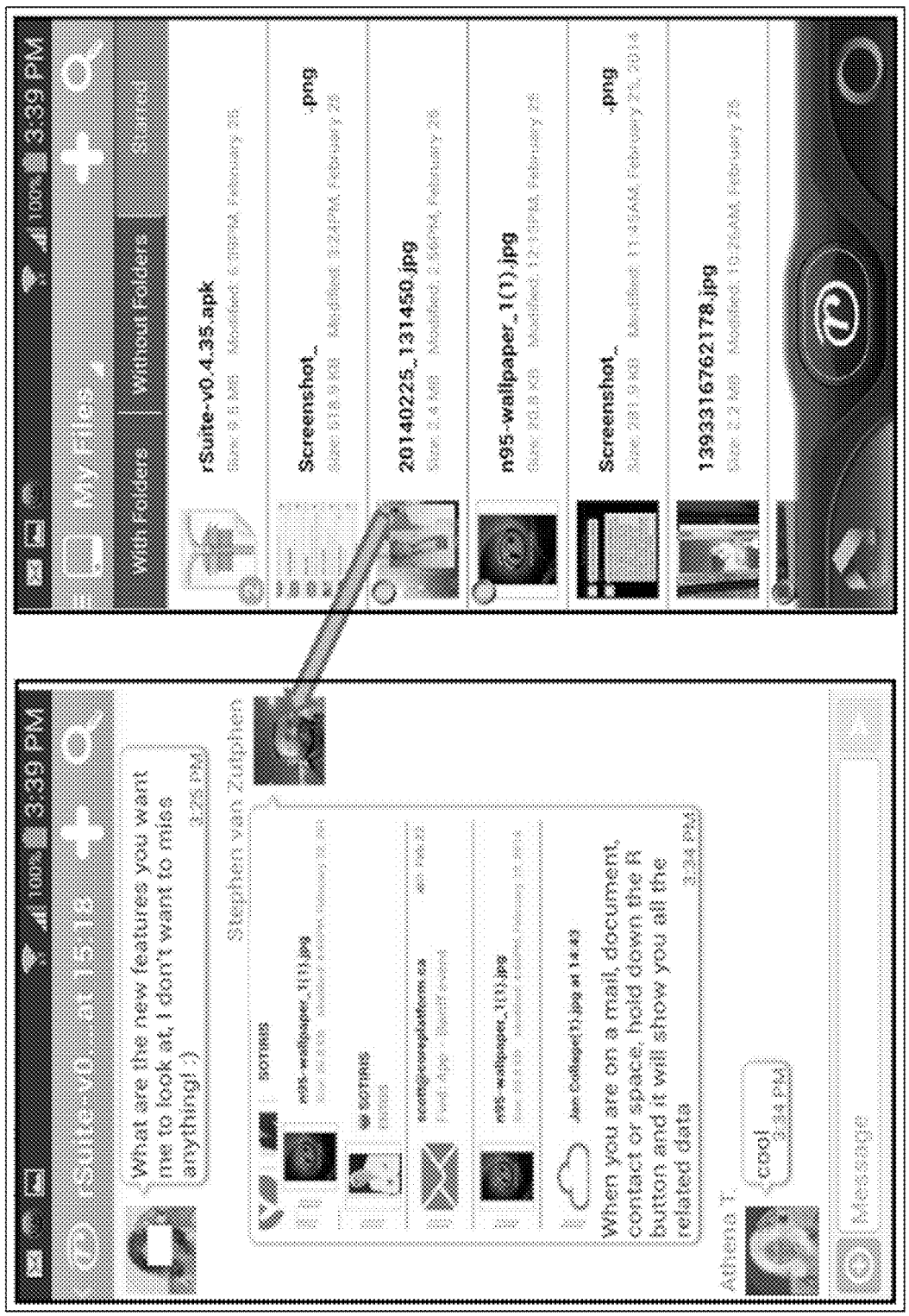

In some embodiments, as shown by screenshots of FIG. 19, the systems and the graphical user interfaces (e.g., the plate) of the instant invention of the instant invention are configured to allow the user to have a discussion, threaded and/or otherwise, about any data object that can include files, videos and/or images. In some embodiments, each data element itself can display a new message count for mail, conversations and/or notes (e.g., as shown by an arrow).

Figure 20:
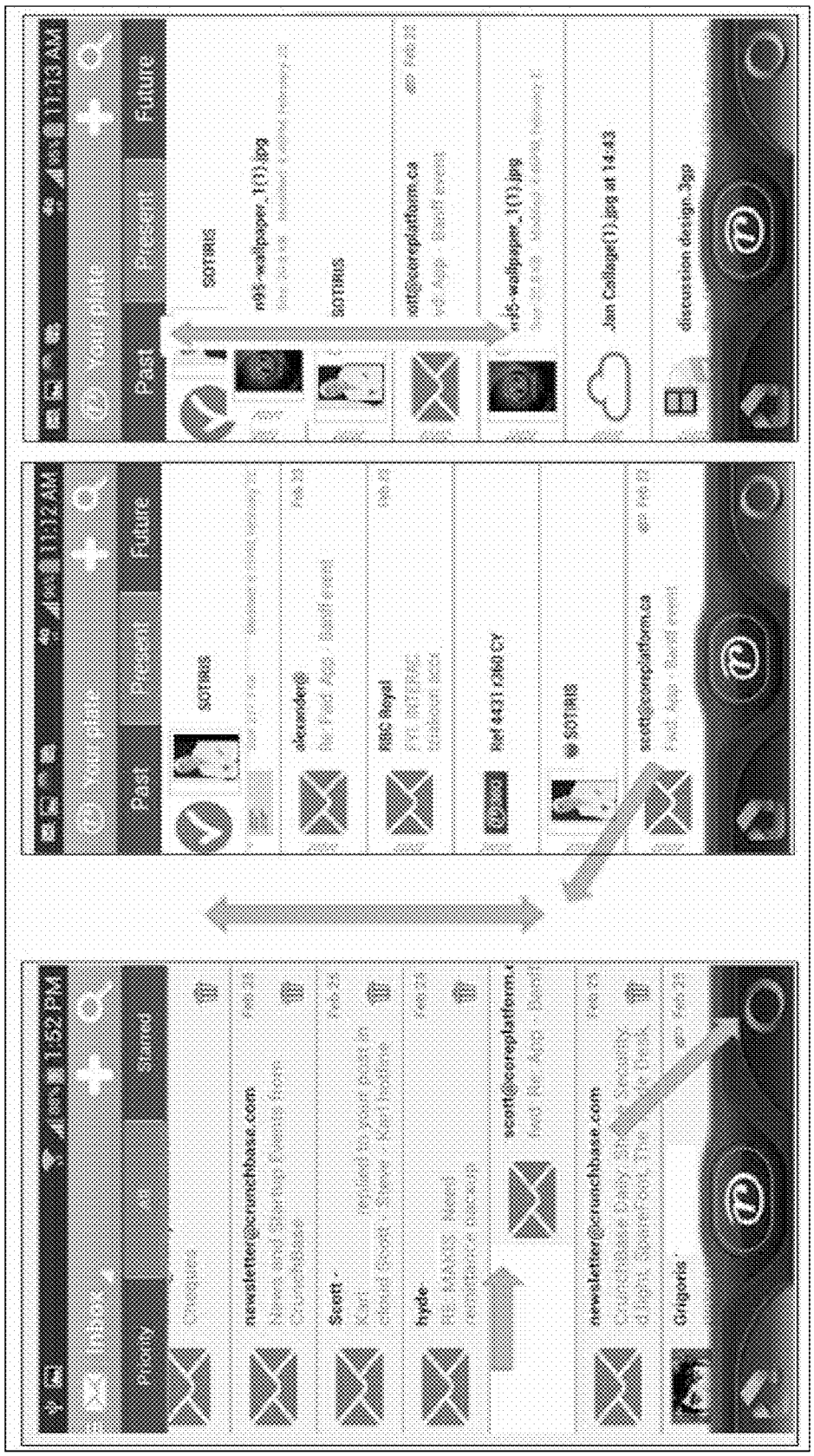

In some embodiments, as shown by screenshots of FIG. 20, the systems and the graphical user interfaces (e.g., the plate) of the instant invention of the instant invention are configured to allow the user to drag any object from the plate onto the "docked" item to create one and/or more instant actions (e.g., share files, invite to projects, forward mails, etc.).

In some embodiments, as shown by screenshots of FIG. 20, the systems and the graphical user interfaces (e.g., the plate) of the instant invention of the instant invention are configured to allow the user to swipe any data object to the right to put it on the plate (arrows shows the directions of swiping and/or corresponding action flow). In some embodiments, as shown by screenshots of FIG. 20, the systems and the graphical user interfaces (e.g., the plate) of the instant invention of the instant invention are configured to allow the user to "dock" an item on the top of the plate by holding the left side of the object down. In some embodiments, as shown by screenshots of FIG. 20, since the plate is an actionable to-do list, the systems and the graphical user interfaces (e.g., the plate) of the instant invention of the instant invention are configured to allow the user to, for example, swipe left to identify an activity as being completed and placed into the "past" area of the plate, and swipe right to put the item (e.g., activity, document, calendar note, email, etc.) into the "Future" area. In some embodiments, the user can get a prompt for when it should appear in the "Present".

Further Illustrative Computer Operating Environments

Figure 21:
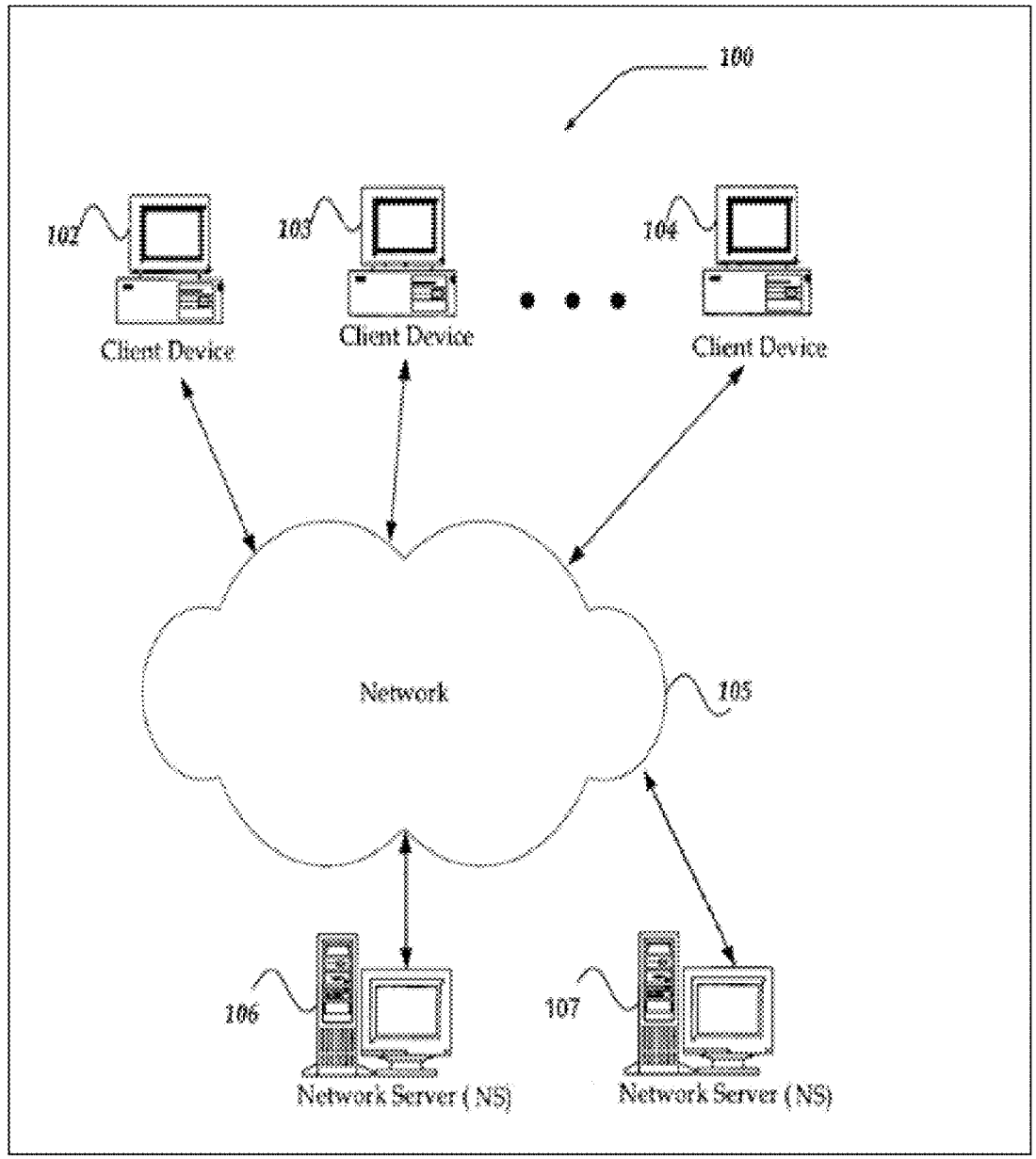
FIGS. 21-29 show diagrams depicting certain aspects of the present invention in accordance with at least some embodiments such as an exemplary computer system architecture.

FIG. 21 illustrates one embodiment of an environment in which the present invention may operate. However, not all of these components may be required to practice the invention, and variations in the arrangement and type of the components may be made without departing from the spirit and/or scope of the present invention. In some embodiment, the inventive systems of the instant invention can process information for a large number of users (e.g., at least 100; at least 1000; at least 10,000; at least 10,000; at least 100,000; at least 1,000,000, etc.) and concurrent computer transactions (e.g., at least 10,000; at least 100,000; at least 1,000,000, etc.). In other embodiments, the system and method are based on a scalable computer and network architecture that incorporates varies strategies for assessing the data, caching, searching, and database connection pooling. An example of the scalable architecture is an architecture that is capable of operating multiple servers.

In embodiments, members of the computer system 102-104 include virtually any computing device capable of receiving and sending a message over a network, such as network 105, to and from another computing device, such as servers 106 and 107, each other, and the like. In embodiments, the set of such devices includes devices that typically connect using a wired communications medium such as personal computers, multiprocessor systems, microprocessor-based and/or programmable consumer electronics, network PCs, and the like. In embodiments, the set of such devices also includes devices that typically connect using a wireless communications medium such as cell phones, smart phones, pagers, walkie talkies, radio frequency (RF) devices, infrared (IR) devices, CBs, integrated devices combining one and/or more of the preceding devices, and/or virtually any mobile device, and the like. Similarly, in embodiments, client devices 102-104 are any device that is capable of connecting using a wired and/or wireless communication medium such as a PDA, POCKET PC, wearable computer, and any other device that is equipped to communicate over a wired and/or wireless communication medium.

In embodiments, each member device within member devices 102-104 may include a browser and/or desktop application that is configured to receive and to send web pages, and the like. In embodiments, the browser and/or desktop application may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, programming may include either Java, .Net, QT, C, C++ and/or other suitable programming language.

In embodiments, member devices 102-104 may be further configured to receive a message from another computing device employing another mechanism, including, but not limited to email, Short Message Service (SMS), Multimedia Message Service (MMS), instant messaging (IM), internet relay chat (IRC), mIRC, Jabber, and the like and/or a Proprietary protocol.

In embodiments, network 105 may be configured to couple one computing device to another computing device to enable them to communicate. In some embodiments, network 105 may be enabled to employ any form of computer readable media for communicating information from one electronic device to another. Also, in embodiments, network 105 may include a wireless interface, and/or a wired interface, such as the Internet, in addition to local area networks (LANs), wide area networks (WANs), direct connections, such as through a universal serial bus (USB) port, other forms of computer-readable media, and/or any combination thereof. In embodiments, on an interconnected set of LANs, including those based on differing architectures and protocols, a router may act as a link between LANs, enabling messages to be sent from one to another.

Also, in some embodiments, communication links within LANs typically include twisted wire pair and/or coaxial cable, while communication links between networks may utilize analog telephone lines, full and/or fractional dedicated digital lines including T1, T2, T3, and T4, Integrated Services Digital Networks (ISDNs), Digital Subscriber Lines (DSLs), wireless links including satellite links, and/or other communications links known to those skilled in the art. Furthermore, in some embodiments, remote computers and other related electronic devices could be remotely connected to either LANs and/or WANs via a modem and temporary telephone link. In essence, in some embodiments, network 105 includes any communication method by which information may travel between client devices 102-104, and servers 106 and 107.

Figure 22:
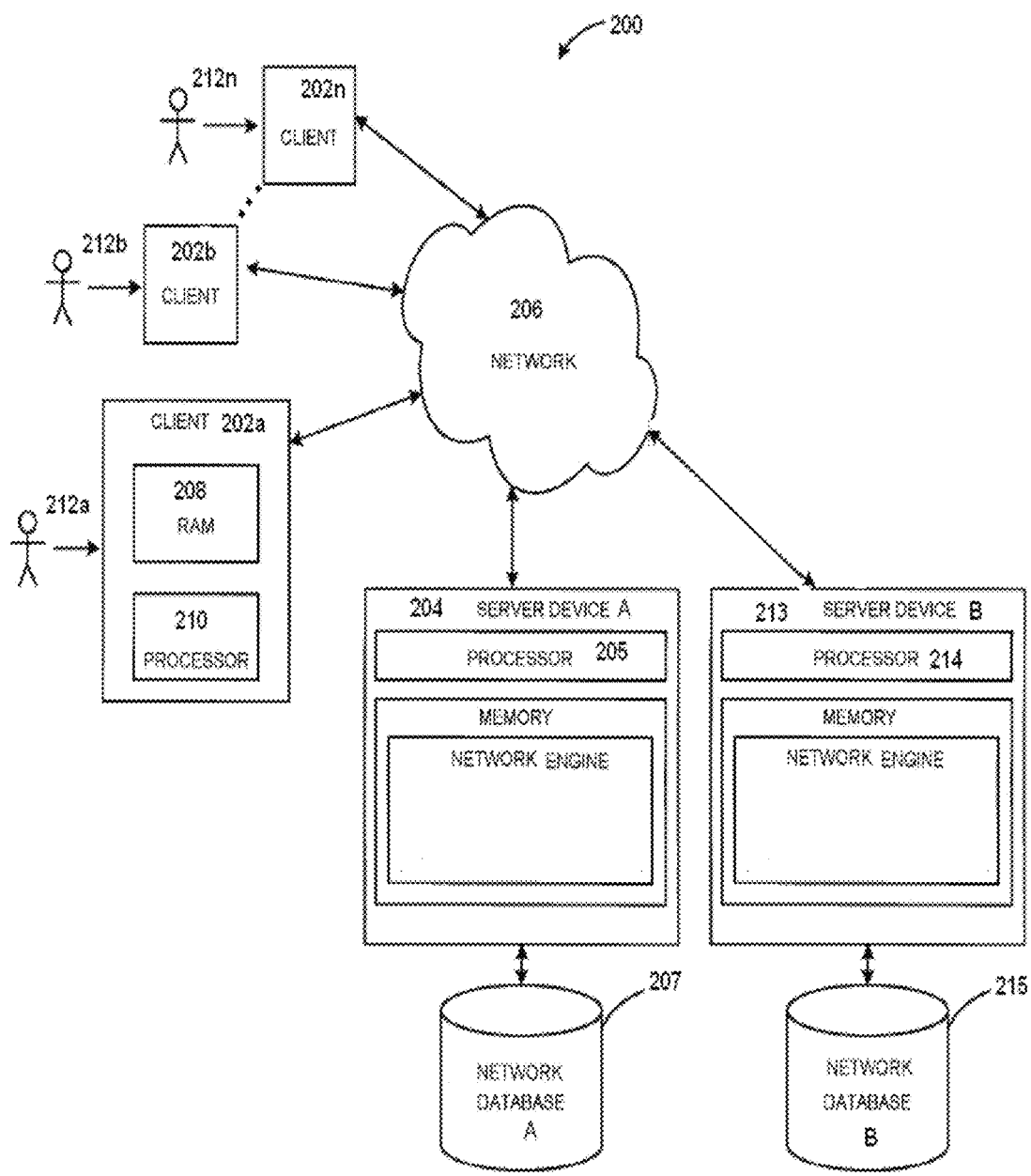

FIG. 22 shows another exemplary embodiment of the computer and network architecture that supports the method and system. In some embodiments, the member devices 202a, 202b thru 202n shown each at least includes a computer-readable medium, such as a random access memory (RAM) 208 coupled to a processor 210 and/or FLASH memory. In some embodiments, the processor 210 may execute computer-executable program instructions stored in memory 208. In some embodiments, such processors comprise a microprocessor, an ASIC, and state machines. In some embodiments, such processors comprise, and/or may be in communication with, media, for example computer-readable media, which stores instructions that, when executed by the processor, cause the processor to perform the steps described herein. In some embodiments, computer-readable media may include, but are not limited to, an electronic, optical, magnetic, and/or other storage and/or transmission device capable of providing a processor, such as the processor 210 of client 202a, with computer-readable instructions. Other examples of suitable media may include, but are not limited to, a floppy disk, CD-ROM, DVD, magnetic disk, memory chip, ROM, RAM, an ASIC, a configured processor, all optical media, all magnetic tape and/or other magnetic media, and/or any other medium from which a computer processor can read instructions. Also, various other forms of computer-readable media may transmit and/or carry instructions to a computer, including a router, private and/or public network, and/or other transmission device and/or channel, both wired and wireless. The instructions may comprise code from any computer-programming language, including, for example, C, C++, Visual Basic, Java, Python, Perl, and JavaScript.

In some embodiments, member devices 202a-n may also comprise a number of external and/or internal devices such as a mouse, a CD-ROM, DVD, a keyboard, a display, and/or other input and/or output devices. Examples of client devices 202a-n may be personal computers, digital assistants, personal digital assistants, cellular phones, mobile phones, smart phones, pagers, digital tablets, laptop computers, Internet appliances, and other processor-based devices. In general, a client device 202a may be any type of processor-based platform that is connected to a network 206 and that interacts with one and/or more application programs. Client devices 202a-n may operate on any operating system capable of supporting a browser and/or browser-enabled application, such as Microsoft™, Windows™, and/or Linux. The client devices 202a-n shown may include, for example, personal computers executing a browser application program such as Microsoft Corporation's Internet Explorer™, Apple Computer, Inc.'s Safari™, Mozilla Firefox, and Opera. Through the client devices 202a-n, users, 212a-n communicate over the network 206 with each other and with other systems and devices coupled to the network

206. As shown in FIG. 22, server devices 204 and 213 may be also coupled to the network 206.

In some embodiments, the term "mobile electronic device" may refer to any portable electronic device that may and/or may not be enabled with location tracking functionality. For example, a mobile electronic device can include, but is not limited to, a mobile phone, Personal Digital Assistant (PDA), Blackberry™, Pager, Smartphone, and/or any other reasonable mobile electronic device. For ease, at times the above variations are not listed and/or are only partially listed, this is in no way meant to be a limitation.

In some embodiments, the terms "proximity detection," "locating," "location data," "location information," and "location tracking" as used herein may refer to any form of location tracking technology and/or locating method that can be used to provide a location of a mobile electronic device, such as, but not limited to, at least one of location information manually input by a user, such as, but not limited to entering the city, town, municipality, zip code, area code, cross streets, and/or by any other reasonable entry to determine a geographical area; Global Positions Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, cartesian coordinates based; Radio Frequency Identification such as, but not limited to, Long range RFID, Short range RFID; using any form of RFID tag such as, but not limited to active RFID tags, passive RFID tags, battery assisted passive RFID tags; and/or any other reasonable way to determine location. For ease, at times the above variations are not listed and/or are only partially listed, this is in no way meant to be a limitation.

In some embodiments, near-field wireless communication (NFC) can represent a short-range wireless communications technology in which NFC-enabled devices are "swiped," "bumped," "tap" and/or otherwise moved in close proximity to communicate. In some embodiments, NFC could include a set of short-range wireless technologies, typically requiring a distance of 10 cm and/or less.

In some embodiments, NFC may operate at 13.56 MHz on ISO/IEC 18000-3 air interface and at rates ranging from 106 kbit/s to 424 kbit/s. In some embodiments, NFC can involve an initiator and a target; the initiator actively generates an RF field that can power a passive target. In some embodiment, this can enable NFC targets to take very simple form factors such as tags, stickers, key fobs, and/or cards that do not require batteries. In some embodiments, NFC peer-to-peer communication can be conducted when a plurality of NFC-enable devices within close proximity of each other.

Figure 23:
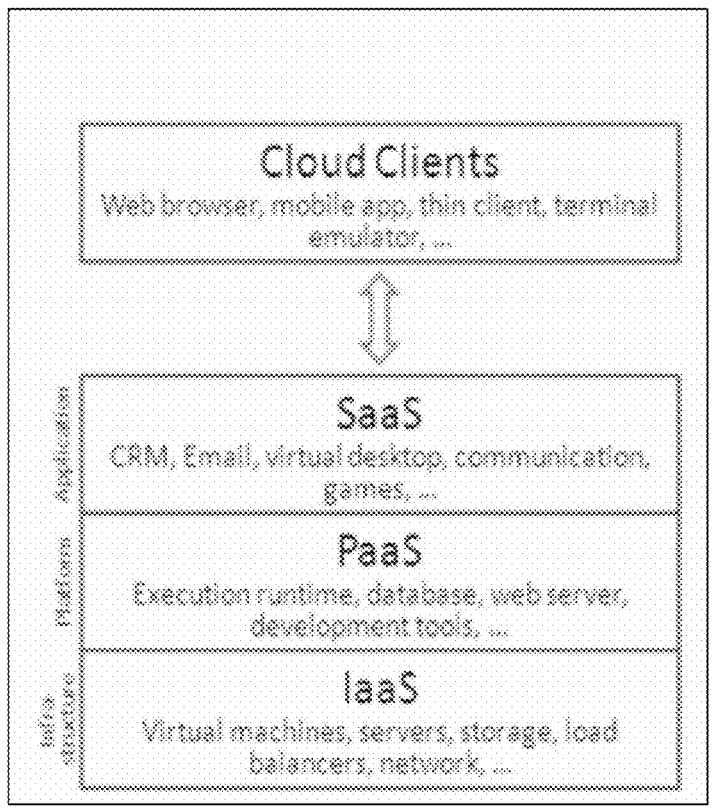
Figure 24:
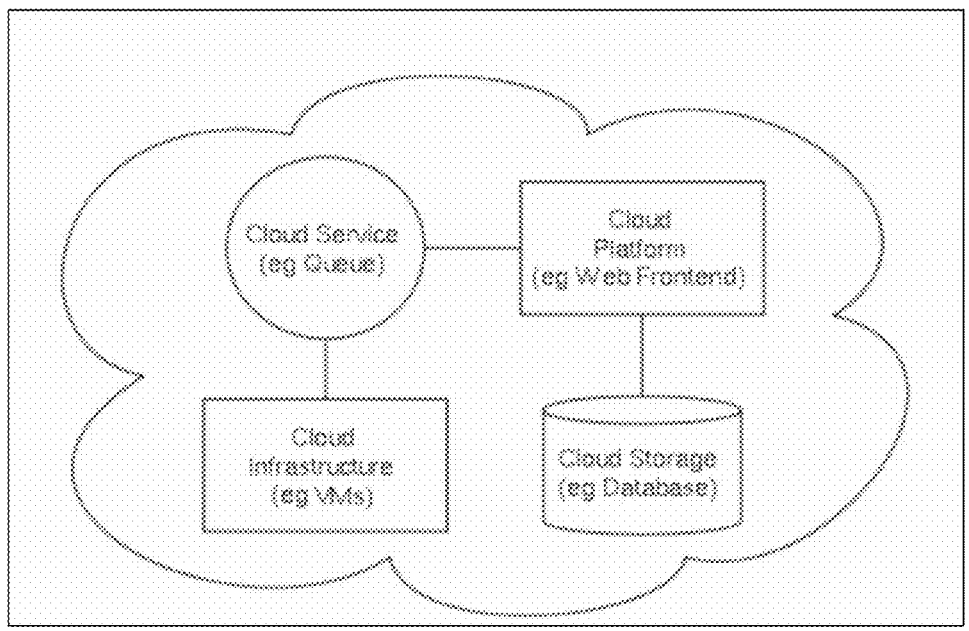

For purposes of the instant description, the terms "cloud," "Internet cloud," "cloud computing," "cloud architecture," and similar terms correspond to at least one of the following: (1) a large number of computers connected through a real-time communication network (e.g., Internet); (2) providing the ability to run a program and/or application on many connected computers (e.g., physical machines, virtual machines (VMs)) at the same time; (3) network-based services, which appear to be provided by real server hardware, and are in fact served up by virtual hardware (e.g., virtual servers), simulated by software running on one and/or more real machines (e.g., allowing to be moved around and scaled up (or down) on the fly without affecting the end user). In some embodiments, the instant invention offers/manages the cloud computing/architecture as, but not limiting to: infrastructure a service (IaaS), platform as a service (PaaS), and software as a service (SaaS). FIGS. 23 and 24 illustrate schematics of exemplary implementations of the cloud computing/architecture.

Of note, the embodiments described herein may, of course, be implemented using any appropriate computer system hardware and/or computer system software. In this regard, those of ordinary skill in the art are well versed in the type of computer hardware that may be used (e.g., a mainframe, a mini-computer, a personal computer ("PC"), a network (e.g., an intranet and/or the internet)), the type of computer programming techniques that may be used (e.g., object oriented programming), and the type of computer programming languages that may be used (e.g., C++, Basic, AJAX, Javascript). The aforementioned examples are, of course, illustrative and not restrictive.

Figure 25:
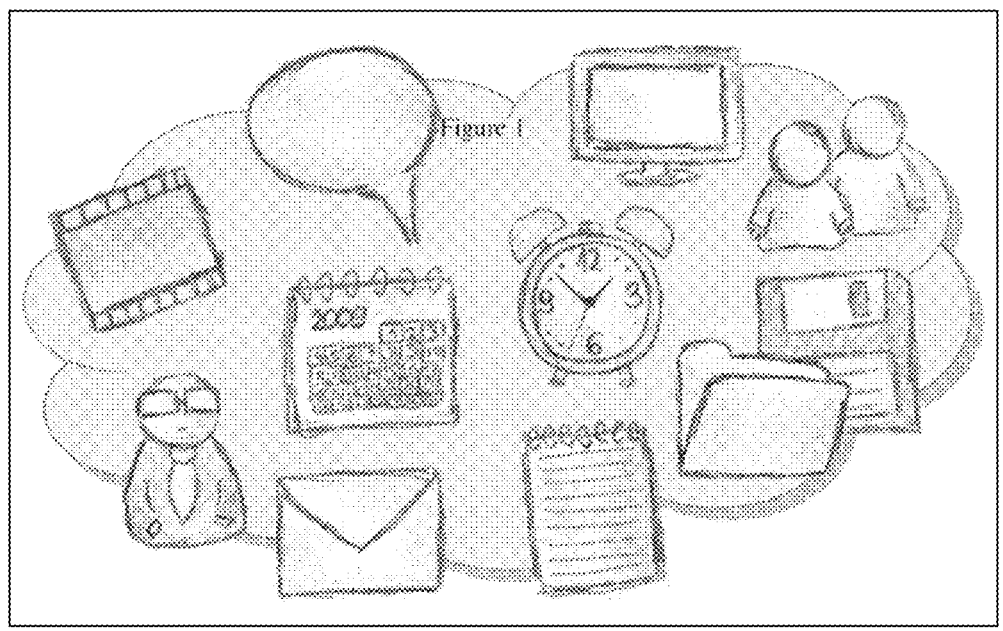

Referring now to FIG. 25, in some embodiments, the computer systems and computer-implemented methods of the instant invention allow the user to access movies, calendars, documents, e-mails, videos, and contacts; communicate/socialize (e.g., tweets, SMS, etc.), and other activities on a instantaneous and/or periodic basis (e.g., hourly, daily, weekly, etc.).

Figure 26:
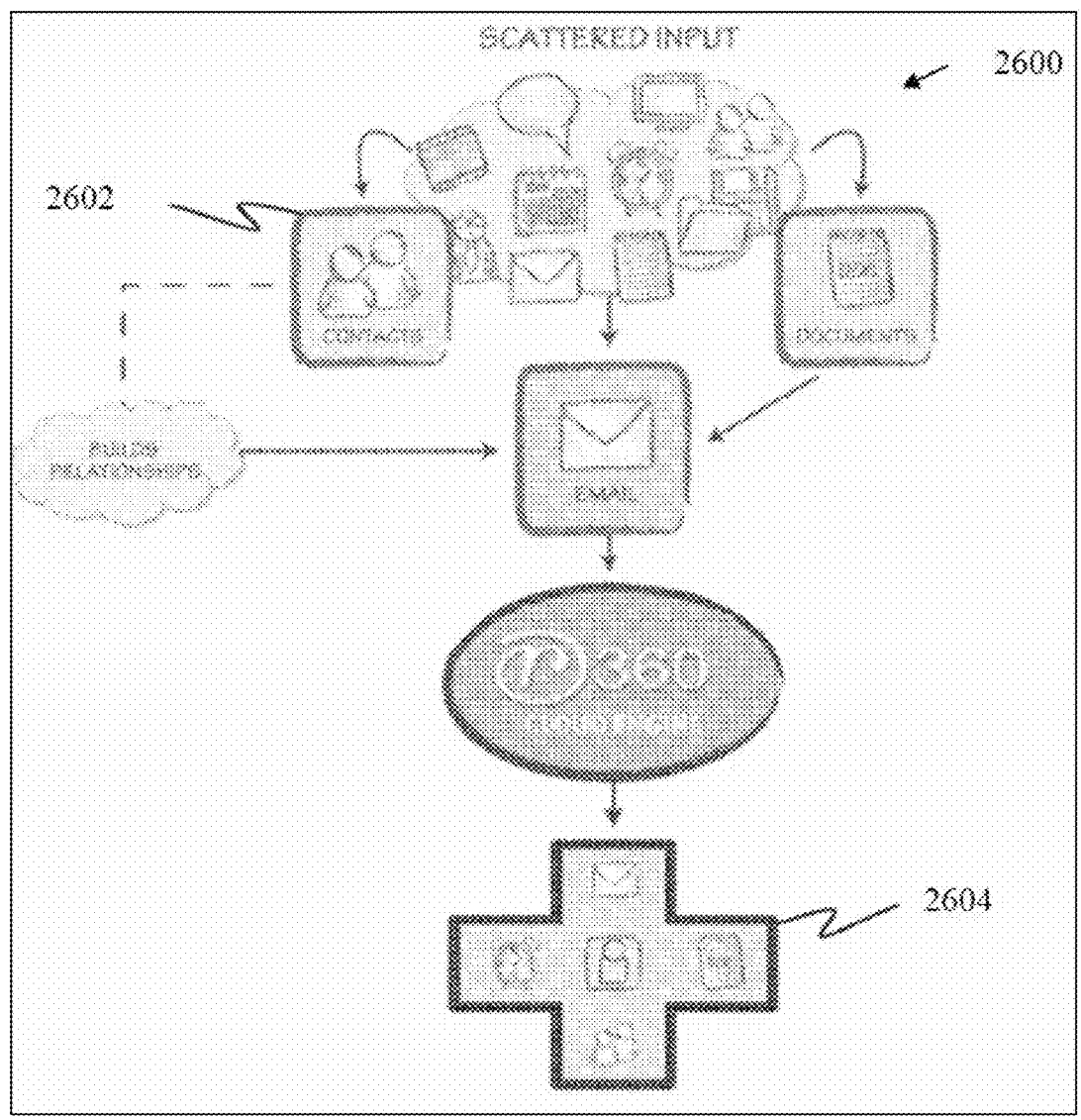

Referring now to FIG. 26, in some embodiments, the systems of the instant invention operate in accordance with a diagram 2600 of a system for server-side database-driven services 2602 that can be accessed by a variety of client side applications 2604. As can be seen, in some embodiments, the system 2600 described herein provides an automatic contextual basis for accessing the variety of content the user normally accesses with a single user interface of the instant invention that ties all the applications together 2604.

Figure 27:
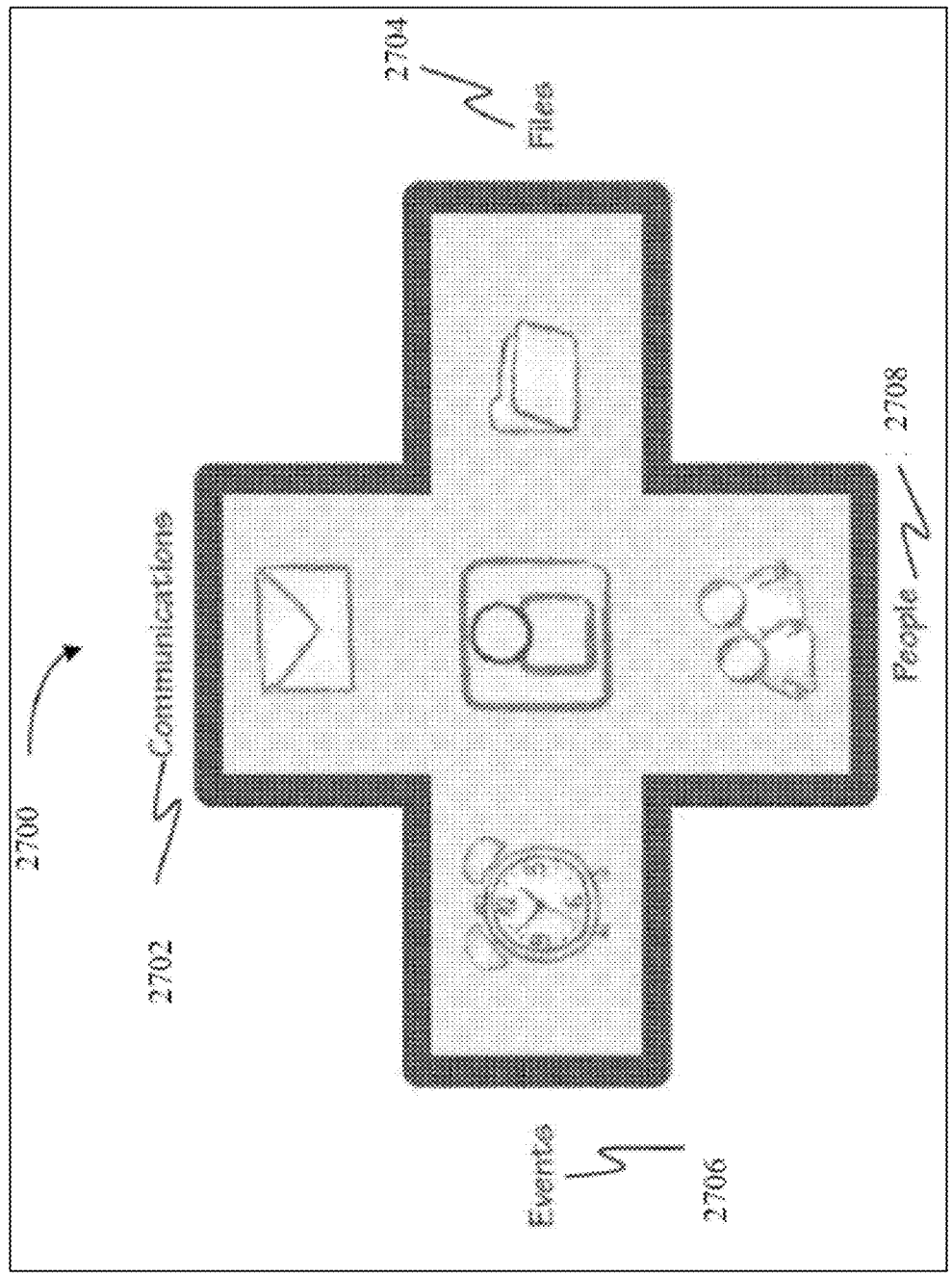

Referring now to FIG. 27, in some embodiments, there is shown a diagram 2700 depicting user motions 2700 to quickly access the system 2700. In some embodiment, the graphical user interfaces of the instant invention can be configured to allow the user utilizing swiping in discrete directions to perform operations with data objects displayed by the graphical user interfaces of the instant invention: communications 2702 use an up swipe, file access 2704 uses a right swipe, events 2706 use a left swipe, and people and/or contacts 2708 use a downward swipe. Although presented in this manner, it will be understood by those with skill in the art that there are many other embodiments and styles motion that can be used.

Figure 28:
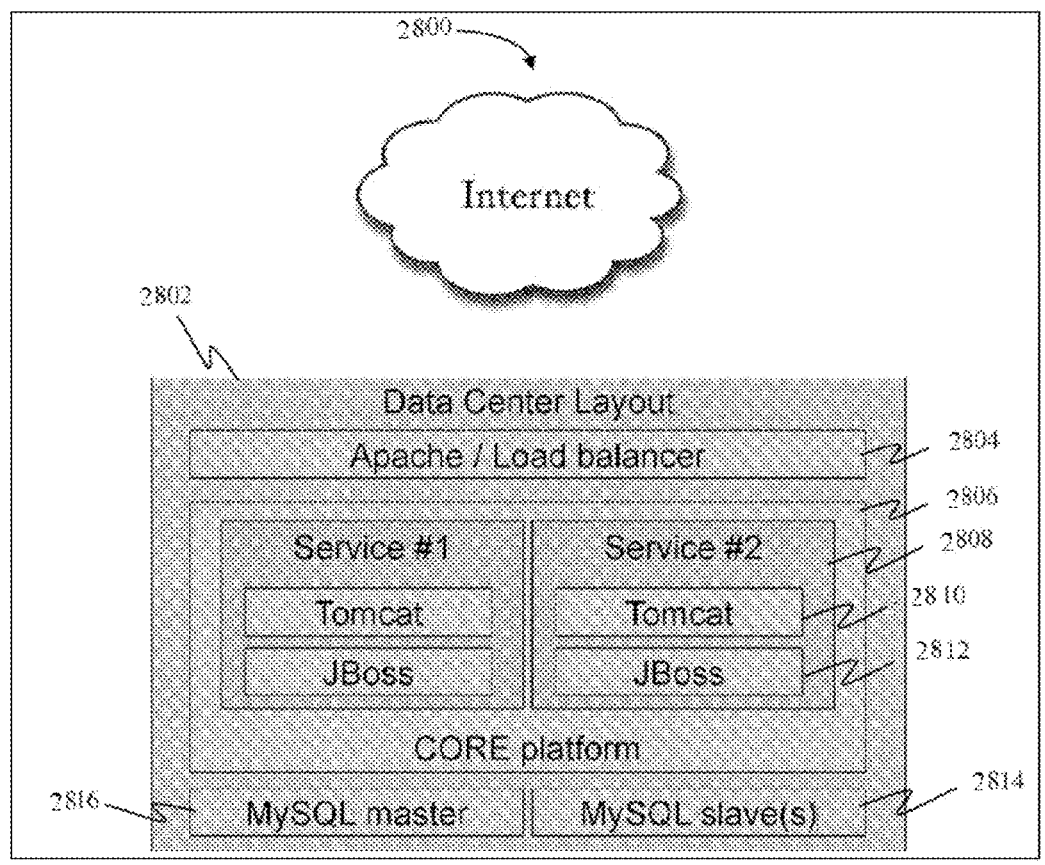

Referring now to FIG. 28, in some embodiments, there is shown a structural diagram 2800 of the server-side subsystem of the system 2800. In some embodiments, the server 2800 comprises a load balancer 2804, one and/or more than one database servers 2814, one and/or more than one instance of JBoss application servers 2812 for servicing the applications 2806 that communicate with an inventive user interface of the instant invention. In some embodiments, the database server 2814 are MySQL® servers comprising at least one master 2816 and one and/or more than slave databases 2814.

Figure 29:
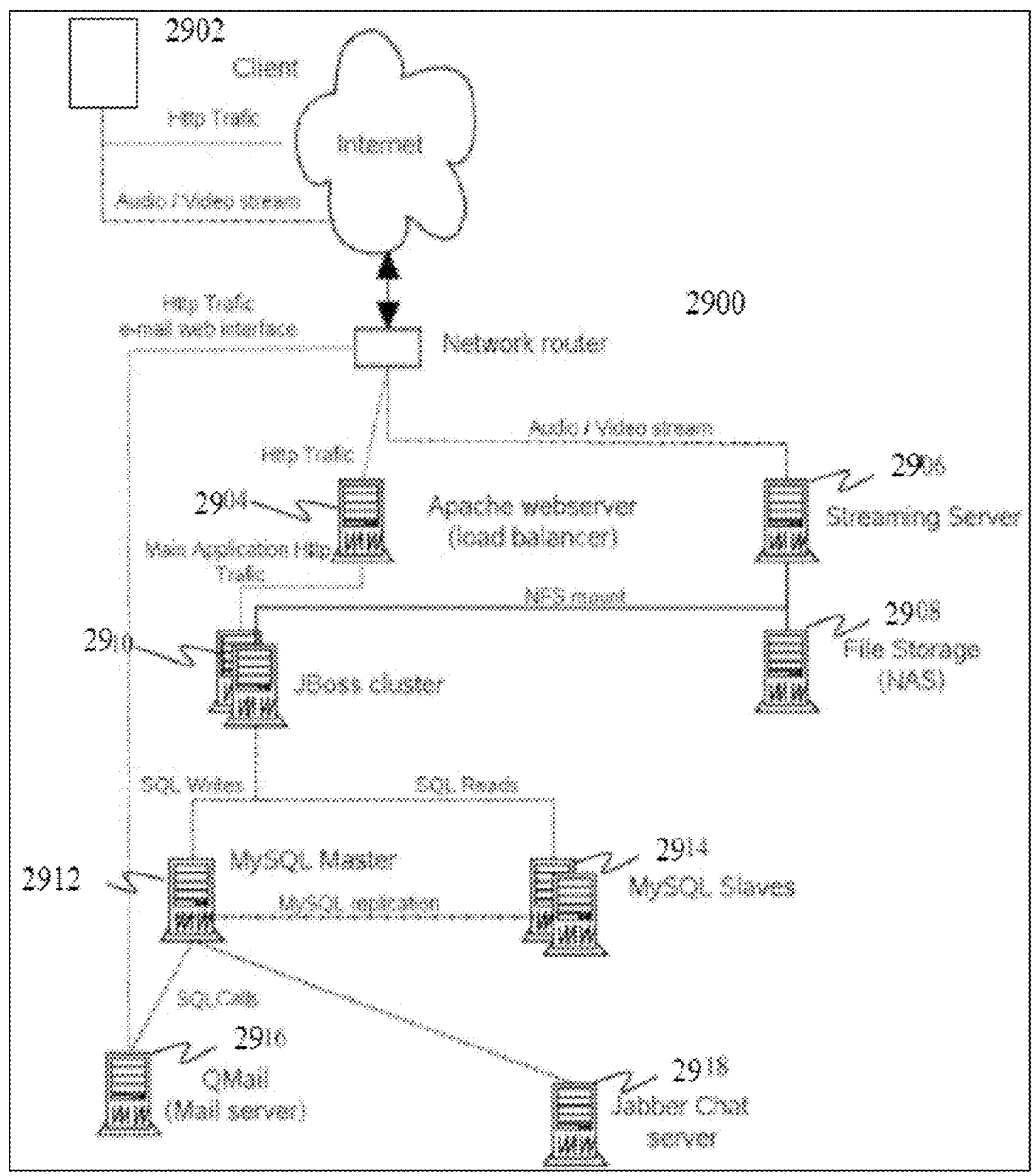

Referring now to FIG. 29, in some embodiments, there is shown an enterprise diagram 2900 of a server-side subsystem of a system 2900. In some embodiments, the user 2902 interact with an inventive user interface of the instant invention, displayed on a mobile device of the user, which requests information from a server 2904. Then, in some embodiments, the request goes to the appropriate data server 1906, 2908 and 2910 as determined by the server-side subsystem 2900. In some embodiments, the data servers 2906, 2908 and 2910 can comprise a file server 2908, a streaming multimedia server 2906, an application server 2910 and/or server cluster 2912 and 2914, a mail server 2916 and a chat server 2918.

In some embodiments, the present invention is directed to an inventive exemplary graphical user interface which includes a visual display component which is: i) specifically programmed with a plurality of actionable features and ii) shown on a computing device of a user; where the plurality of actionable features allow the user, interacting with the visual display component, to perform, at a particular time period, at least the following: moving to and from the visual display component at least the following items: i) at least one first object corresponding to at least one first functionality of at least one first native application which is at least partially executable within the graphical user interface to perform at least one first native functionality; ii) at least one second object corresponding to at least one second functionality of at least one second native application which is at least partially executable within the graphical user interface to perform at least one second native functionality, where the at least one first native application is distinct from the at least one second native application; iii) at least one third object corresponding to at least one first data item of a first data type; and iv) at least one fourth object corresponding to at least one second data item of a second data type, where the first data type is distinct from the second data type; v) where each item of such items is moved by utilizing a single action by the user while each item is an in active form or in an inactive form; vi) where the visual display component is programmed such that when at least one item of such items is placed over the visual display, the visual display component allows the user to specify at least one of the following: 1) at least one first instant action involving the at least one item, 2) at least one first future action involving the at least one item, and 3) at least one first organizational action involving a first visual presentation of the at least one item on the visual display component; vii) where the visual display component is programmed such that when the at least one item of such items is placed over at least one other item of such items, the visual display component allows the user to specify at least one of the following: 1) at least one second instant action involving the at least one item and the at least one other item of such items, 2) at least one second future action involving the at least one item and the at least one other item of such items, and 3) at least one second organizational action involving a second visual presentation of the at least one item and the at least one other item of such items on the visual display component; tracking such items based on timing of actions involving such items, where the timing includes: i) a present time period corresponding to items being active at a particular time, ii) a past time period corresponding to items being active prior to the particular time and are inactive at the particular time, and iii) a future time period corresponding to items being in active at the particular time and will be active after the particular time passes; and interacting with each item of such items via the visual display component so that: i) each item behaves as if being in a native computing environment, and ii) a second execution of the native computing environment as an entire native program in parallel with the graphical user interface is avoided.

In some embodiments, the single action is a drag-and-drop action. In some embodiments, the single action is a swiping action. In some embodiments, the exemplary graphical user interface is configured to be executed as a stand-alone program on a desktop of the computing device. In some embodiments, the graphical user interface is configured to be remotely executed so that as computer instructions for the visual display component is transmitted to the computing device of the user over a computer network.

In some embodiments, the at least one first functionality of the at least one first native application is the at least one first native application.

In some embodiments, the at least one second functionality of the at least one second native application is the at least one second native application. In some embodiments, the at least one first data item and the at least one second data item are selected from the group consisting of: i) a digital file, ii) an electronic message, and iii) an electronic Internet posting, and iv) a digital code.

In some embodiments, the first visual presentation and the second visual presentation specify a priority order in which such items are presented on the graphical user interface.

In some embodiments, the graphical user interface and the computing device of the user are specifically programmed to allow the user at least a plurality of the following: 1) by selecting at least one keyboard key, to create a recording and automatically associate the recording with the at least one item of such items with which the user is interacting; 2) to listen to the recording while browsing through such items and to start and stop the recording from within each item; 3) selecting a single menu button, to receive a global notification of all messages for such items; 4) to receive a plurality of priority notifications having different colors for different levels of urgency; 5) to receive at least one notification related to each item of such item while the user interacts with each item; 6) to select different parts of a visual presentation of each item to perform distinct actions with each item; 7) to automatically create a relationship between such items when the at least one item of such items is placed over the at least one other item of such items; 8) to have a digital note being automatically placed in an area of the visual display component that is contextually related each item discussed in the digital note; 9) selecting a single menu button, to perform an action of obtaining data related to each item across a plurality of native applications; 10) to engaged in both threaded and non-threaded digital discussions; 11) to view a single area of the computing device which changes, at least partially, in color depending on a message type of an electronic message, an importance parameter associated with of the electronic message, or both; 12) to continuously view a message count; and 13) to participate in a conversation related to each item of such items with a plurality of participants.

In some embodiments, the present invention is directed to a computer-implemented method which includes at least the steps of: causing, by a specifically programmed computing processor, to display a graphical user interface on a computing device of a user; where the graphical user interface includes: a visual display component which is specifically programmed with a plurality of actionable features; where the plurality of actionable features allow the user, interacting with the visual display component, to perform, at a particular time period, at least the following: moving to and from the visual display component at least the following items: i)

at least one first object corresponding to at least one first functionality of at least one first native application which is at least partially executable within the graphical user interface to perform at least one first native functionality; ii) at least one second object corresponding to at least one second functionality of at least one second native application which is at least partially executable within the graphical user interface to perform at least one second native functionality, where the at least one first native application is distinct from the at least one second native application; iii) at least one third object corresponding to at least one first data item of a first data type; and iv) at least one fourth object corresponding to at least one second data item of a second data type, where the first data type is distinct from the second data type; v) where each item of such items is moved by utilizing a single action by the user while each item is in an active form or in an inactive form; vi) where the visual display component is programmed such that when at least one item of such items is placed over the visual display, the visual display component allows the user to specify at least one of the following: 1) at least one first instant action involving the at least one item, 2) at least one first future action involving the at least one item, and 3) at least one first organizational action involving a first visual presentation of the at least one item on the visual display component; vii) where the visual display component is programmed such that when the at least one item of such items is placed over at least one other item of such items, the visual display component allows the user to specify at least one of the following: 1) at least one second instant action involving the at least one item and the at least one other item of such items, 2) at least one second future action involving the at least one item and the at least one other item of such items, and 3) at least one second organizational action involving a second visual presentation of the at least one item and the at least one other item of such items on the visual display component; tracking such items based on timing of actions involving such items, where the timing includes: i) a present time period corresponding to items being active at a particular time, ii) a past time period corresponding to items being active prior to the particular time and are inactive at the particular time, and iii) a future time period corresponding to items being in active at the particular time and will be active after the particular time passes; and interacting with each item of such items via the visual display component so that: i) each item behaves as if being in a native computing environment, and ii) a second execution of the native computing environment as an entire native program in parallel with the graphical user interface is avoided.

While a number of embodiments of the present invention have been described, it is understood that these embodiments are illustrative only, and not restrictive, and that many modifications may become apparent to those of ordinary skill in the art. Further still, the various steps may be carried out in any desired order (and any desired steps may be added and/or any desired steps may be eliminated).

What is claimed is:

1. A specifically programmed computing device, comprising:
   wherein the specifically programmed computing device is associated with a user and is specifically programmed to generate a visually displayed actionable to-do list which is a visual representation of a specifically programmed software container;
   wherein the specifically programmed software container is being executed by a specifically programmed computing processor;
   wherein the visually displayed actionable to-do list is caused to be displayed by the specifically programmed computing processor;
   wherein the specifically programmed software container comprises a plurality of actionable software objects associated with a plurality of native software applications;
   wherein each actionable software object corresponds to at least one particular software functionality of a particular native software application, at least one particular data object associated with the particular native software application, or both;
   wherein each native software application is distinct from every other native software application of the plurality of native software applications;
   wherein the specifically programmed software container is distinctly programmed from each native software application of the plurality of native software applications;
   wherein the visually displayed actionable to-do list comprises:
   i) a present actionable area, corresponding to a first time period configured as a present time period, wherein the present actionable area displays a subset of first actionable software objects of the plurality of actionable software objects which have been associated with the present time period based on:
      1) at least one first action, being performed by the user,
      2) at least one second action, being automatic performed by the specifically programmed computing processor when a future time period becomes the present time period, or
      3) both;
   ii) a future actionable area, corresponding to a second time period configured as the future time period, wherein the future actionable area displays a subset of second actionable software objects of the plurality of actionable software objects which have been associated with the future time period based on at least one third action, being performed by the user;
   iii) a past actionable area, corresponding to a third time period configured as a past time period, wherein the past actionable area displays a subset of third actionable software objects of the plurality of actionable software objects which have been associated with the past time period based on:
      1) at least one fourth action, being performed by the user,
      2) at least one fifth action, being automatic performed by the specifically programmed computing processor when the present time period becomes the past time period, or
      3) both;
   wherein, when being executed by the specifically programmed computing processor, the specifically programmed software container is specifically programmed to allow the user to perform, based on a single action, at least the following:
   i) moving a particular actionable software object of the plurality of actionable software objects from a respective native application to the visually displayed actionable to-do list,
   ii) moving the particular actionable software object of the plurality of actionable software objects between the present actionable area, the future actionable area, and the past actionable area of the visually displayed actionable to-do list,
iii) moving the particular actionable software object of the plurality of actionable software objects within each actionable area of the visually displayed actionable to-do list,
iv) specifying at least one of the following:
   1) at least one instant action involving the particular actionable software object,
   2) at least one future action involving the particular actionable software object, and
   3) at least one organizational action involving a visual positioning of the particular actionable software object within a particular actionable area of the visually displayed actionable to-do list; and
v) performing a particular activity with the particular actionable software object within the specifically programmed software container represented by the visually displayed actionable to-do list without visually presenting the respective native application to the user.

2. The specifically programmed computing device of claim 1, wherein the single action is a drag-and-drop action.

3. The specifically programmed computing device of claim 1, wherein the single action is a swiping action.

4. The specifically programmed computing device of claim 1, wherein the visually displayed actionable to-do list is configured to be presented as a stand-alone software program on a screen of the specifically programmed computing device.

5. The specifically programmed computing device of claim 1, wherein the specifically programmed software container is remotely executed from the specifically programmed computing device of the user and wherein the specifically programmed computing processor is programmed to transmit a plurality of computer instructions for the visually displayed actionable to-do list to the specifically programmed computing device of the user over a computer network.

6. The specifically programmed computing device of claim 1, wherein the at least one particular data object is selected from the group consisting of:
   i) a digital file,
   ii) an electronic mail message, and
   iii) an electronic Internet posting, and
   iv) a digital note.

7. The specifically programmed computing device of claim 1, wherein the at least one organizational action specifies a visual priority positioning order in which the particular actionable software object is presented within the particular actionable area of the visually displayed actionable to-do list.

8. The specifically programmed computing device of claim 1, wherein the visually displayed actionable to-do list specifically programmed software container is further specifically programmed to allow the user to perform at least a plurality of the following:
   1) creating a recording that is automatically associated with the particular actionable software object with which the user is interacting;
   2) selecting a first single menu button associated with the visually displayed actionable to-do list to receive a global notification of all messages related to the particular actionable software object;
   3) selecting different parts of a visual presentation of the particular actionable software object to perform distinct actions with the particular actionable software object;
   4) automatically creating an actionable relationship between a first actionable software object and a second actionable software object of the plurality of actionable software objects by placing the first actionable software object on top of the second actionable software object; and
   5) selecting a second single menu button associated with the visually displayed actionable to-do list to perform obtaining data related to the particular actionable software object across the plurality of native applications.

9. A computer-implemented method, comprising:
causing, a specifically programmed computing processor, to display a visually displayed actionable to-do list which is a visual representation of a specifically programmed software container, wherein the visually displayed actionable to-do list is displayed on a specifically programmed computing device of a user;
wherein the specifically programmed software container comprises a plurality of actionable software objects associated with a plurality of native software applications;
wherein each actionable software object corresponds to at least one particular software functionality of a particular native software application, at least one particular data object associated with the particular native software application, or both;
wherein each native software application is distinct from every other native software application of the plurality of native software applications;
wherein the specifically programmed software container is distinctly programmed from each native software application of the plurality of native software applications;
wherein the visually displayed actionable to-do list comprises:
   i) a present actionable area, corresponding to a first time period configured as a present time period, wherein the present actionable area displays a subset of first actionable software objects of the plurality of actionable software objects which have been associated with the present time period based on:
      1) at least one first action, being performed by the user,
      2) at least one second action, being automatic performed by the specifically programmed computing processor when a future time period becomes the present time period, or
      3) both;
   ii) a future actionable area, corresponding to a second time period configured as the future time period, wherein the future actionable area displays a subset of second actionable software objects of the plurality of actionable software objects which have been associated with the future time period based on at least one third action, being performed by the user;
   iii) a past actionable area, corresponding to a third time period configured as a past time period, wherein the past actionable area displays a subset of third actionable software objects of the plurality of actionable software objects which have been associated with the past time period based on:
      1) at least one fourth action, being performed by the user,
      2) at least one fifth action, being automatic performed by the specifically programmed computing processor when the present time period becomes the past time period, or
      3) both;

wherein, when being executed, the specifically programmed software container is specifically programmed to allow the user to perform, based on a single action, at least the following:
- i) moving a particular actionable software object of the plurality of actionable software objects from a respective native application to the visually displayed actionable to-do list,
- ii) moving the particular actionable software object of the plurality of actionable software objects between the present actionable area, the future actionable area, and the past actionable area of the visually displayed actionable to-do list,
- iii) moving the particular actionable software object of the plurality of actionable software objects within each actionable area of the visually displayed actionable to-do list,
- iv) specifying at least one of the following:
  - 1) at least one instant action involving the particular actionable software object,
  - 2) at least one future action involving the particular actionable software object, and
  - 3) at least one organizational action involving a visual positioning of the particular actionable software object within a particular actionable area of the visually displayed actionable to-do list; and
- v) performing a particular activity with the particular actionable software object within the specifically programmed software container represented by the visually displayed actionable to-do list without visually presenting the respective native application to the user.

10. The method of claim 9, wherein the single action is a drag-and-drop action.

11. The method of claim 9, wherein the single action is a swiping action.

12. The method of claim 9, wherein the visually displayed actionable to-do list is configured to be presented as a stand-alone software program on a screen of the specifically programmed computing device.

13. The method of claim 9, wherein the specifically programmed software container is remotely executed from the specifically programmed computing device of the user and wherein the specifically programmed computing processor is programmed to transmit a plurality of computer instructions for the visually displayed actionable to-do list to the specifically programmed computing device of the user over a computer network.

14. The method of claim 9, wherein the at least one particular data object is selected from the group consisting of:
- i) a digital file,
- ii) an electronic mail message, and
- iii) an electronic Internet posting, and
- iv) a digital note.

15. The method of claim 9, wherein the at least one organizational action specifies a visual priority positioning order in which the particular actionable software object is presented within the particular actionable area of the visually displayed actionable to-do list.

16. The method of claim 9, wherein the visually displayed actionable to-do list specifically programmed software container is further specifically programmed to allow the user to perform at least a plurality of the following:
- 1) creating a recording that is automatically associated with the particular actionable software object with which the user is interacting;
- 2) selecting a first single menu button associated with the visually displayed actionable to-do list to receive a global notification of all messages related to the particular actionable software object;
- 3) selecting different parts of a visual presentation of the particular actionable software object to perform distinct actions with the particular actionable software object;
- 4) automatically creating an actionable relationship between a first actionable software object and a second actionable software object of the plurality of actionable software objects by placing the first actionable software object on top of the second actionable software object; and
- 5) selecting a second single menu button associated with the visually displayed actionable to-do list to perform obtaining data related to the particular actionable software object across the plurality of native applications.

* * * * *